United States Patent [19]

Nakagakiuchi et al.

[11] Patent Number: 5,546,128
[45] Date of Patent: Aug. 13, 1996

[54] EXPOSURE CONTROL APPARATUS INCLUDING A SPATIAL LIGHT MODULATOR

[75] Inventors: Susumu Nakagakiuchi; Shinobu Ueda, both of Nagaokakyo, Japan

[73] Assignee: Mitsubishi Denki Kabushiki Kaisha, Tokyo, Japan

[21] Appl. No.: 402,057

[22] Filed: Mar. 10, 1995

Related U.S. Application Data

[62] Division of Ser. No. 925,880, Aug. 7, 1992, Pat. No. 5,418,546.

[30] Foreign Application Priority Data

Aug. 20, 1991 [JP] Japan .................................. 3-208185
Sep. 17, 1991 [JP] Japan .................................. 3-236202

[51] Int. Cl.⁶ .................................................. H04N 5/232
[52] U.S. Cl. ........................... 348/362; 348/207; 359/224
[58] Field of Search ..................................... 348/362, 335, 348/207, 203, 771; 359/223, 224

[56] References Cited

U.S. PATENT DOCUMENTS

| | | | |
|---|---|---|---|
| 4,023,158 | 5/1977 | Corcoran | 345/31 |
| 4,099,172 | 7/1978 | Montanari et al. | 345/31 |
| 4,662,746 | 5/1987 | Hornbeck | 359/223 |
| 5,084,756 | 1/1992 | Muehlhausen | 348/96 |
| 5,101,275 | 3/1992 | Wijnen | 348/362 X |
| 5,146,073 | 9/1992 | Wirth et al. | 250/201.9 |
| 5,170,156 | 12/1992 | DeMond et al. | 345/85 |
| 5,212,555 | 5/1993 | Stoltz | 348/335 X |
| 5,369,433 | 11/1994 | Baldwin et al. | 348/207 |
| 5,418,546 | 5/1995 | Nakagakiuchi et al. | |

FOREIGN PATENT DOCUMENTS

| | | | |
|---|---|---|---|
| 2581780 | 11/1986 | France . | |
| 213071 | 1/1990 | Japan . | |
| 2076481 | 3/1990 | Japan | H04N 5/335 |
| 340693 | 2/1991 | Japan . | |
| 1592789 | 7/1981 | United Kingdom . | |

Primary Examiner—Wendy Greening

[57] ABSTRACT

An exposure control apparatus has a lens, a photoelectric conversion device, and a spatial light modulator. The spatial light modulator varies the amount of light received from the lens and reflected to the photoelectric conversion device. A control unit controls the spatial light modulator, and thus the exposure of the image focused on the lens, based on output from the photoelectric conversion device.

20 Claims, 20 Drawing Sheets

EXPOSURE CONTROL APPARATUS INCLUDING A SPATIAL LIGHT MODULATOR

This application is a divisional of application Ser. No. 07/925,880, filed on Aug. 7, 1992, now U.S. Pat. No. 5,418,546, the entire contents of which are hereby incorporated by reference.

BACKGROUND OF THE INVENTION

1. Field of the Invention

The present invention relates to a visual display system for displaying a video signal or image data in the form of a visible image, and to an exposure control apparatus for a video camera or the like.

2. Description of Related Art

In recent years, demand has been increasing for larger-area and/or higher-definition screens than the screens offered by conventional display devices such as cathode ray tubes (CRTs) or liquid crystal displays (LCDs). Such demand has been further increased by consumers' demand for large-screen televisions, coupled with the demand from many people who want to enjoy shows on a large screen or who need to view screens generated by a computer in conferences or the like.

LCDs are suitable for use with small-size computer systems and terminal devices, particularly laptop and portable computers; LCDs for such applications are constructed using liquid crystal cells, each individual cell corresponding to one pixel on the screen. LCDs are sensitive to temperature, are difficult to construct in large size, have a slow response, and require external illumination for viewing. The resolution of the LCD is limited by the complexity of its driving system, the result of which is that the size of the LCD generally increases with increasing resolution. This means an inevitable increase in the size of the projection optical system used, and hence an increase in the cost of a high-definition system. Another problem is that light passed through the LCD (or reflected from it) is polarized, as a result of which the sensation of brightness varies nonlinearly with the distance from the center of the field of view.

The most widely used display system is the CRT. However, the CRT has various shortcomings, the first one being the cost. The high cost is due to the difficulty involved in the production of large-size display tubes and the requirement of large volumes of raw materials (particularly glass) for construction. As a result, the display becomes very heavy, is not easy to transport, and therefore, is not suitable for use in a small-size display system. The resolution is also a problem with the CRT.

Another shortcoming of such conventional display systems is that they are essentially an analog type. Therefore, when displaying information stored in digital form in a computer, the information must first be converted into a form compatible with the analog raster scanning for displaying on the CRT.

Japanese Patent Application Laid-Open No. 3-40693 discloses a visual display system using a spatial light modulator to overcome the above enumerated shortcomings. The system disclosed therein will be described below as a prior art example that most closely relates to the present invention.

FIG. 1 shows the construction of a two-dimensional digital visual display system comprising an image generating system 501 and a display screen 502. Light emitted from a light source 510 is collected by a mirror 511 which reflects the light into a lens 512. The lenses 512, 513, and 514 together form a beam columnator which acts to collimate the incident light 509 into a columnar light 508, the light energy being thus intensified to enhance the overall efficiency of the system. A folding mirror 520 reflects the columnar light 508 through an optical path 507 into a spatial light modulator 515. The spatial light modulator 515 selectively redirects portions of the light, passed through the optical path 507, toward a magnifying lens 505 to form an image on the display screen 502. The spatial light modulator 515 used in this example is one generally known as a deformable mirror device.

The spatial light modulator 515 has a surface 516 onto which the light from the optical path 507 is projected. The surface 516 contains a plurality of switchable elements 517 which can be controlled so as to redirect the incident light toward the magnifying lens 505. When one element 517 is placed in a certain orientation, a portion of light passed through the optical path 507 is redirected into an optical path 506 toward the magnifying lens 505. The portion of the light is magnified or enlarged by the magnifying lens 505 and projected through an optical path 504 onto the display screen 502 to illuminate a pixel 503.

A computer 519 controls the operation of the spatial light modulator 515 via a bus 518 so that portions of the light from the optical path 507 are selectively redirected toward the display screen 502 to form an image thereon. The bus 518 carries necessary control signals and image information from the computer 519 to the spatial light modulator 515. The computer 519 is, for example, a digital signal processor.

FIG. 2 shows the configuration of an electronic optical apparatus used for the above described visual display system. As shown, a signal source 640, which is, for example, a TV tuner, is connected to an electronic optical system 644 via a bus 642. The bus 642 leads to an A/D converter 646. An analog signal is fed via the bus 642 to the A/D converter 646 for conversion into a digital code representing the chrominance and luminance information of each pixel of an image. The digital code from the A/D converter 646 is placed on a bus 648 for transfer to a buffer memory 650. The digital code is thus stored in the buffer memory 650. In a different mode, such digital code or information can be loaded into the buffer memory 650 from an external computer or graphics system via a bus 652.

The digital code or information represents an image to be displayed. The digital code stored in the buffer memory 650 is transferred to a central processing unit (CPU) 654 via a bus 658. The CPU 654 is connected to a video memory 660 via a bus 658. The CPU 654 decodes the video signal, including the chrominance and luminance signals, contained in the information transferred from the buffer memory 650. The CPU 654 is so programmed as to extract the image from the information and store the information, including the chrominance and luminance signals, into the video memory 660. The image is further processed by the CPU 654 through a command given via a bus 662 or under control of the program contained in the CPU 654. Thereafter, the processed image data is transferred to a shift register for input to an array in the space light modulator, the image data being loaded into row and column decoders. It is also possible to load image information into the video memory 660 from an external computer or graphics system via a bus 668.

The electronic optical system 644, together with a projection system 672, constitutes an image generating system 674, for which the image generating system 501 of FIG. 1 with the spatial light modulator 515 connected via the bus 518 to the video memory 660 can be substituted. The image stored in the video memory 660 is transferred to the projection system 672 via a bus 670 and is displayed through an optical path 676 on a display screen 678.

In the prior art visual display system, however, the spatial light modulator is a flat surface type wherein numerous mirrors are arranged in minute patterns on a semiconductor surface. The space light modulator of such construction having a plurality of controllable elements arranged on a flat surface has the problem of low yields in semiconductor fabrication due to a large silicon chip area, increasing the cost and reducing the reliability of the visual display system. Another problem is that addressing circuitry for the controllable elements of surface type and circuitry for light modulation, i.e., circuitry for driving the controllable elements, become large and complex, which is a limiting factor in the downsizing of the system. There is the further problem that the design freedom is limited in that the width-to-height ratio (aspect ratio) of the image forming surface is determined by the shape of the spatial light modulator unless an additional special optical system is provided.

FIG. 3 is a diagram illustrating the construction of a prior art diaphragm mechanism. When an actuator 705 is moved, a ring 706 is turned, which in turn moves an actuating pin 704 fixed on the ring 706 to move a diaphragm fan 701 over a lens 702 with a fixed pin 703 acting as the fulcrum, so that the size of the aperture area is varied.

FIG. 4 is a block diagram illustrating a prior art lens diaphragm control mechanism. The lens diaphragm control mechanism comprises: a lens 801; a diaphragm 802; an image pick-up element for converting the optical image into electrical signals; a preamplifier 804 for amplifying the output of the image pick-up element 803 to a suitable magnitude; a photometric circuit 805 for extracting, out of the video signal outputted from the preamplifier 804, the portions that correspond to the photometric area; a detection circuit 806; a diaphragm control circuit, 807 for feedback control of the diaphragm 802 to bring the output of the detection circuit 806 into agreement with a predetermined reference voltage; and a pulse generator 808 for controlling the photometric circuit 805 by using vertical and horizontal synchronizing pulses or the like.

Light passed through the lens 801 is focused onto the image pick-up element 803, the amount of light being suitably controlled by the diaphragm 802. The image pick-up element 803 converts the optical image focused thereon into an electrical signal, i.e. a video signal, which is then amplified by the preamplifier 804 to a magnitude suitable for later processing. The amplified video signal is fed to the photometric circuit 805, which is under control of the pulse generator 808, and only the portions of the video signal that correspond to the photometric area are supplied to the detection circuit 806. The detection circuit 806 integrates the input signal to produce a photometric signal of the level corresponding to the mean luminance of the photometric area of the video signal. The photometric signal is inputted to the diaphragm control circuit 807. The diaphragm control circuit 807 performs feedback control of the diaphragm 802 to bring this value into agreement with the predetermined reference voltage.

However, there are an infinite variety of objects that may be placed for imaging at the image pick-up position, and they cannot be limited to particular types. From some kinds of objects, good images can be obtained with a fixed photometric area, while from others, proper images cannot be obtained with the fixed photometric area. For example, in a backlight situation where the object of interest is positioned in the center of the scene against a background consisting mostly of high luminosity areas, the high luminosity areas will become dominant factors in the photometric area, causing the diaphragm to tend to close down for the object; the resulting image of the object will appear all black. Conversely, in an excessive frontlight situation where most of the background is dark, the diaphragm will tend to open up for the object because of the darkness of the background, causing everywhere in the final image to appear pale and washed out.

FIGS. 5(a) and 5(b) are schematic diagrams illustrating the construction of a prior art image projection system. In FIG. 5(a), a lens 910 is directed toward the object for imaging. At this time, a reflecting mirror 911 is positioned as shown by dotted line, so that the object is focused on an image pick-up element 912 by the lens 910. When it is desired to enlarge the image for projection, the system is rearranged as shown in FIG. 5(b). At this time, the reflecting mirror 911 is manipulated and placed in a horizontal position as shown by solid line. In this arrangement, the image on a liquid crystal display 913 illuminated by a light source 914 is enlarged through the lens 910 for projection. The above construction is disclosed in Japanese Patent Application Laid-Open No. 2-13071.

In the prior art image projection system of the above construction, since the system configuration must be rearranged between the imaging and image projection situations, it takes a lot of time and effort for the rearrangement. Furthermore, since a component in the optical path is moved, the focusing accuracy of the system lowers.

As described above, the prior art exposure control apparatus relies on a lot of mechanical actions for controlling the diaphragm, and therefore, has the problem of slow operating speed and low reliability. Furthermore, the prior art apparatus needs a large number of parts, and is complex and expensive in construction. Moreover, because of the construction of the apparatus which is incorporated in the lens system, exposure control can only be performed collectively on the entire light sensitive elements, and partial corrections of exposure cannot be performed. Furthermore, in the prior art, no exposure control apparatus has been available with additional functions other than its originally intended functions.

SUMMARY OF THE INVENTION

It is an object of the present invention to provide an inexpensive and highly reliable visual display system.

It is another object of the invention to provide a visual display system wherein driving circuitry for controllable elements is simplified.

It is a further object of the invention to provide a visual display system that permits the aspect ratio of a projection screen to be varied without an addition of special optical systems.

It is a still further object of the invention to provide an exposure control apparatus wherein the number of mechanical moving parts and the number of component parts are reduced.

It is yet anther object of the invention to provide an inexpensive and highly reliable exposure control apparatus that permits partial exposure control.

It is a further object of the invention to provide an exposure control apparatus equipped with an additional function that permits the apparatus to be used as an enlarging projector.

In the visual display system of the invention, light from a light source is modulated by a spatial light modulator having a plurality of controllable elements arranged in a line, and the modulated light is scanned by an optical scanning device to display an image. The reflecting or refracting surfaces of the optical scanning device are movable so that line images reflected from the spatial light modulator are expanded into a surface image for display.

When the optical scanning device is provided with selectivity with respect to the wavelength of light, a color visual display is achieved. One scanning cycle of the optical scanning device is made shorter than one cycle period of the critical flicker frequency of the human eye. Either the light source emits a pulse light whose repetition period is equal to the duration of time the optical scanning device scans across the width of the controllable elements of the spatial light modulator, or a shutter is provided which is adapted to pass light from the light source for that duration of time. Furthermore, the controllable elements of the spatial light modulator are controlled more than one time during that duration of time, in synchronism with the operation of the optical scanning device.

According to the invention, there is also provided an exposure control apparatus having a lens, a photoelectric conversion device, and a spatial light modulator, wherein the spatial light modulator is operated to vary the amount of light to be supplied to the photoelectric conversion device, thereby controlling the exposure for the image focused by the lens.

In an alternative mode of the invention, the exposure control apparatus further comprises an exposure analysis unit for monitoring the exposure condition and a controller for controlling the spatial light modulator, wherein the image condition is monitored and analyzed to control the exposure. Exposure control is performed by detecting the mean luminance level of the whole or part of the screen and controlling the spatial light modulator when the detected luminance level is too high. Exposure control is also performed in such a manner that portions where the luminance level exceeds a threshold level are extracted and the spatial light modulator is operated to control the exposure selectively for those portions designated by their addresses.

In a further alternative mode of the invention, the exposure control apparatus is also adapted for use as an image projector, wherein an image is formed by using the spatial light modulator originally intended for exposure control and the image is projected by passing an image light through optical paths in reverse direction from when shooting.

The above and further objects and features of the invention will more fully be apparent from the following detailed description with accompanying drawings.

DESCRIPTION OF THE PREFERRED EMBODIMENTS

The present invention will now be described in detail by way of example with reference to the accompanying drawings.

Figure 1:
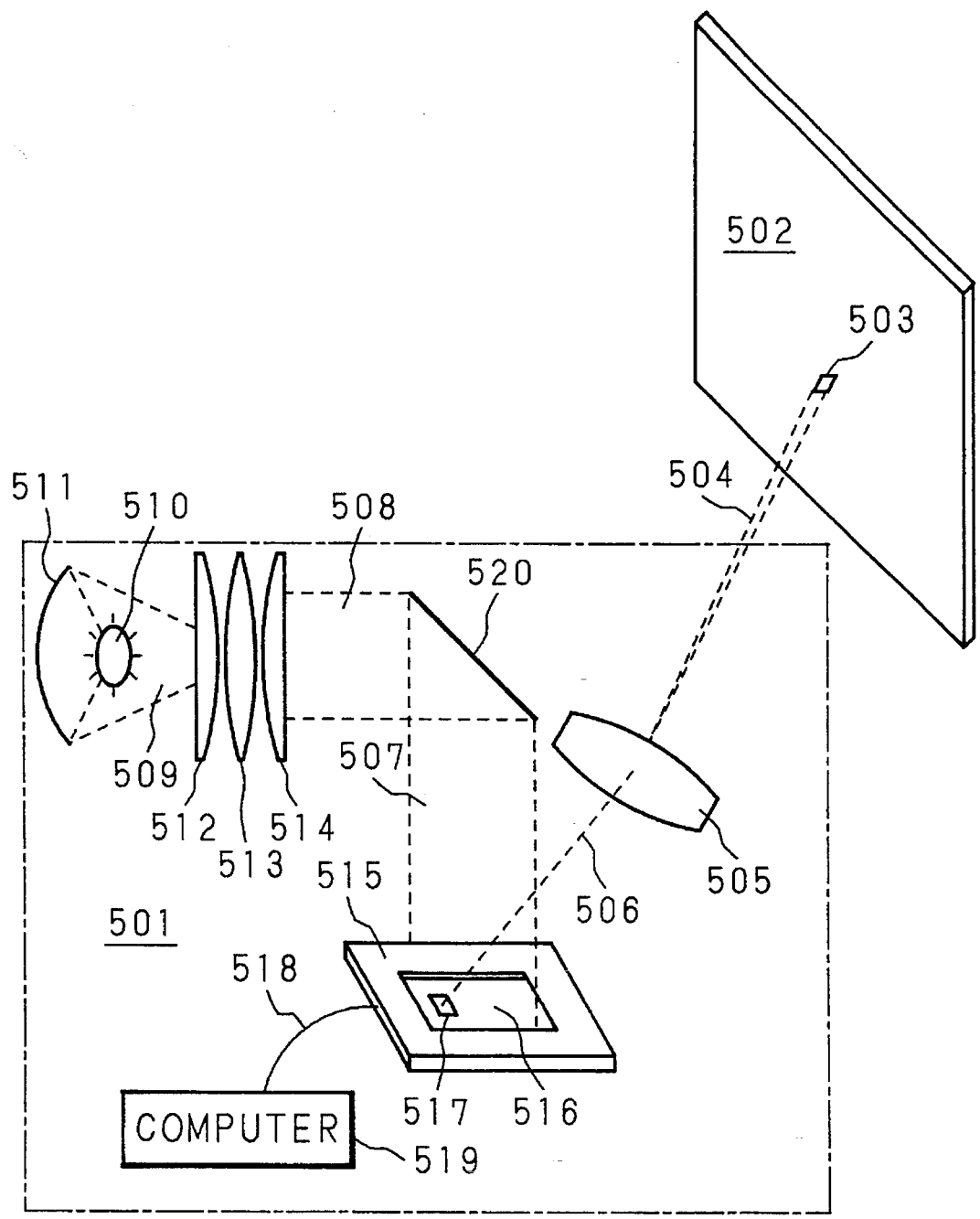
FIG. 1 is a schematic diagram illustrating the construction of a prior art visual display system.
Figure 2:
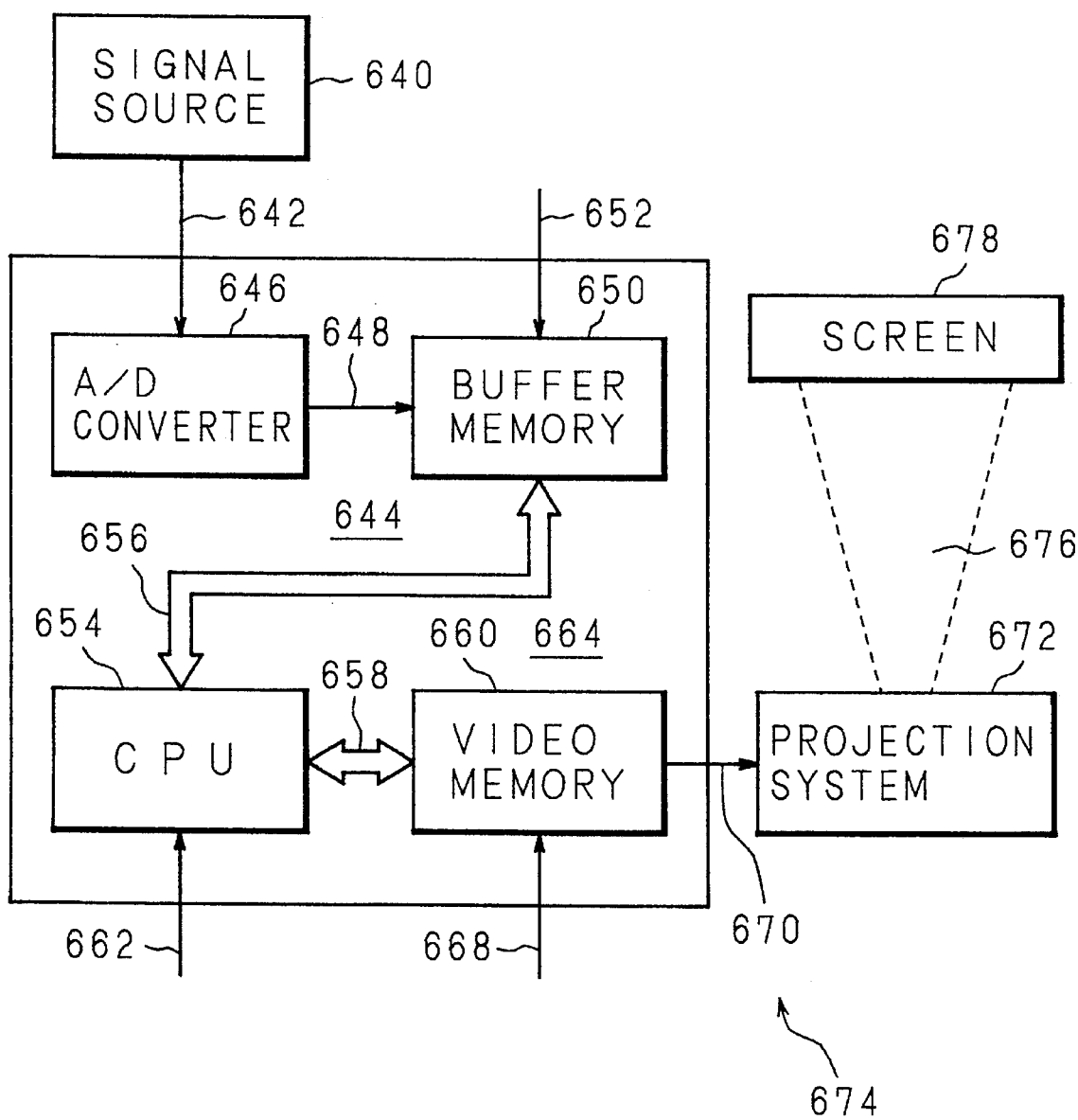
FIG. 2 is a block diagram illustrating the configuration of an electronic optical apparatus for the prior art visual display system.
Figure 3:
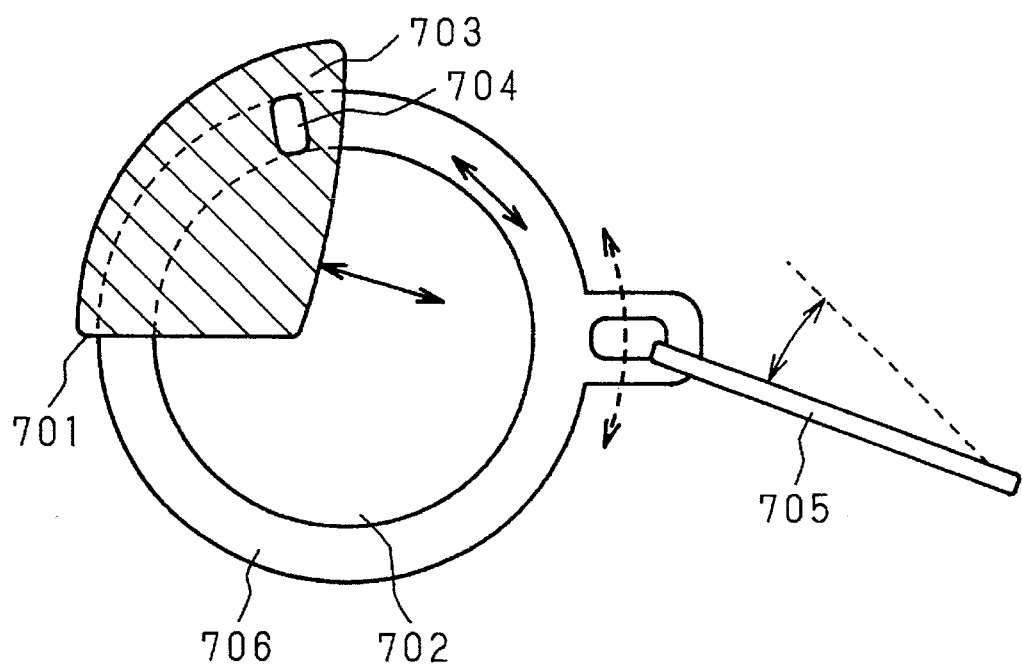
FIG. 3 is a diagram illustrating the construction of a prior art diaphragm.
Figure 4:
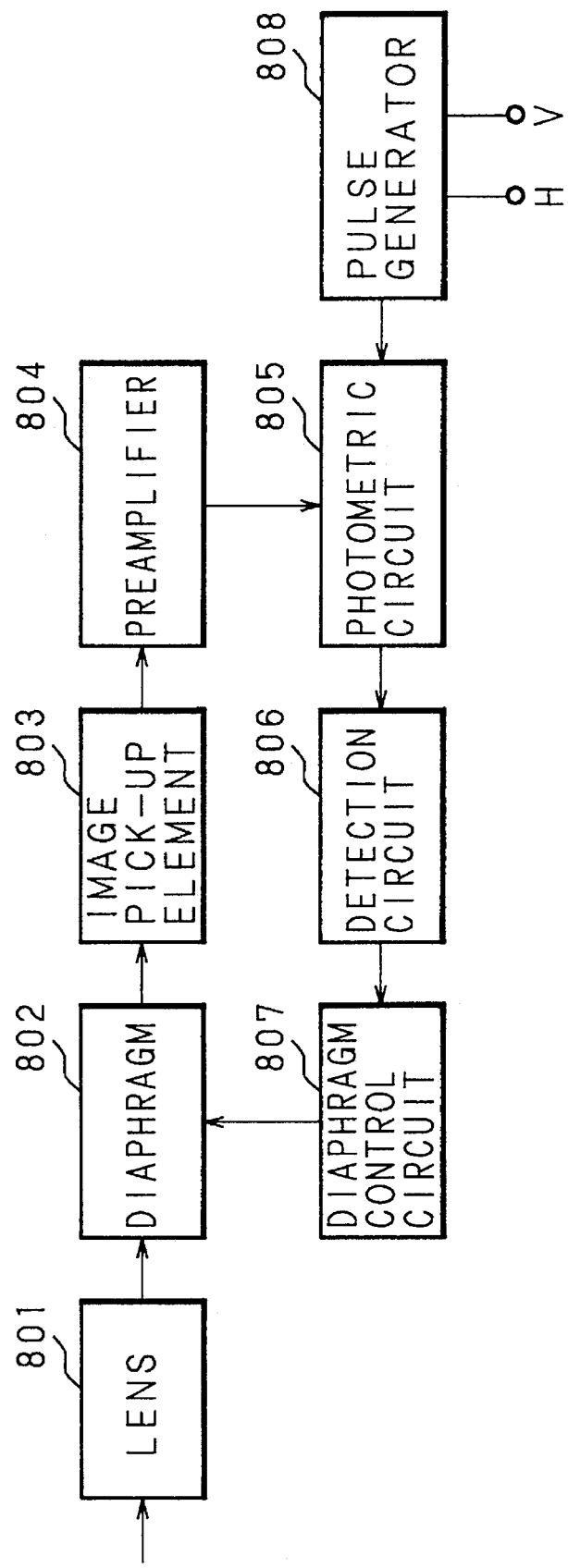
FIG. 4 is a block diagram illustrating the configuration of a prior art exposure control apparatus.
Figure 5A:
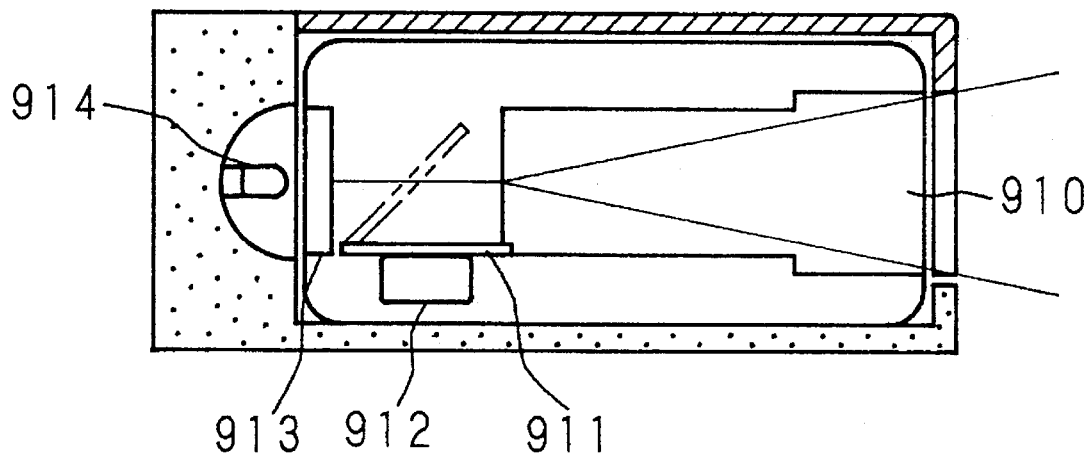
FIGS. 5(a) and 5(b) are schematic diagrams illustrating the construction of a prior art image projection system.
Figure 5B:
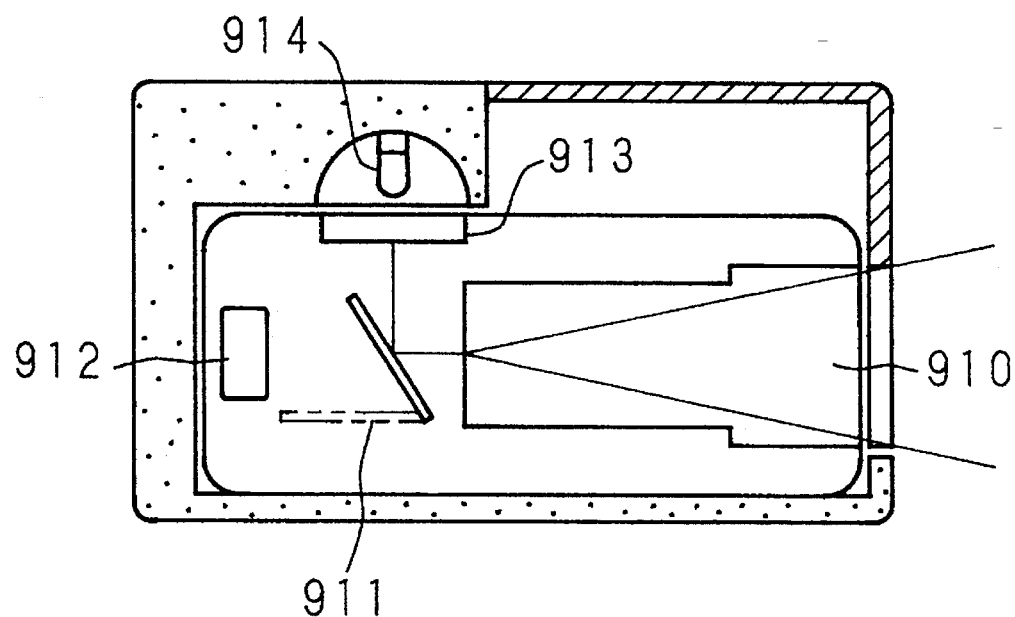
Figure 6:
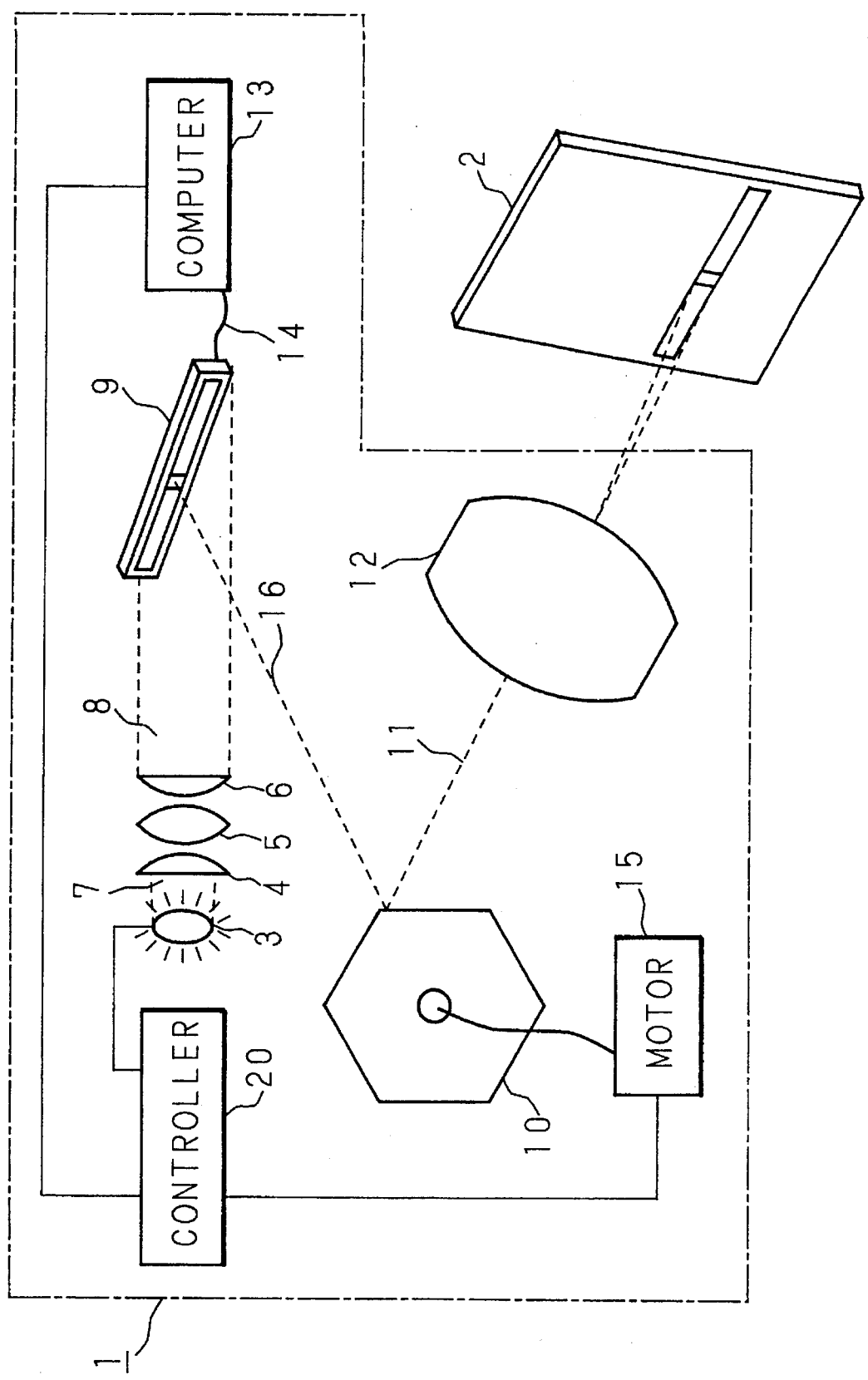
FIG. 6 is a schematic diagram illustrating the construction of a visual display system according to the present invention.

FIG. 6 shows the construction of a two-dimensional digital visual display system comprising an image generating system 1 and a display screen 2, according to one embodiment of the invention. The display screen 2 may be constructed from a relatively planar sheet of suitable material, or may be formed in a shape so curved as to converge reflected light in the direction of the observer. Furthermore, the display screen 2 may be formed from a translucent material for rear projection.

A light source 3 provides light energy which finally reaches and illuminates the display screen 2. An ordinary light source, such as an incandescent lamp or halogen lamp, is used as the light source 3.

Light 7 emitted from the light source 3 is directed toward a lens 4. The lenses 4, 5, and 6 together form a beam columnator which acts to collimate the light 7 into a columnar light 8, thus preventing the dispersion of light and enhancing the overall efficiency of the system.

The columnar light 8 is projected onto a spatial light modulator 9. A different method may be used to direct the converged light energy source to the spatial light modulator 9. The spatial light modulator 9 acts to selectively redirect the columnar light 8 toward an optical scanning device 10. The spatial light modulator 9 used in this embodiment is identical or similar to a deformable mirror device (DMD) as disclosed in U.S. Pat. Nos. 4,441,791, 4,710,732, 4,596,992, 4,615,595 and 4,662,746.

In this embodiment, the optical scanning device 10 consists of a reflecting mirror of hexagonal columnar shape. The mirror may be either of plane shape, as shown in FIG. 7, of triangular columnar shape, as shown in FIG. 8, or of polygonal columnar shape, as shown in FIG. 9.

Figure 7:
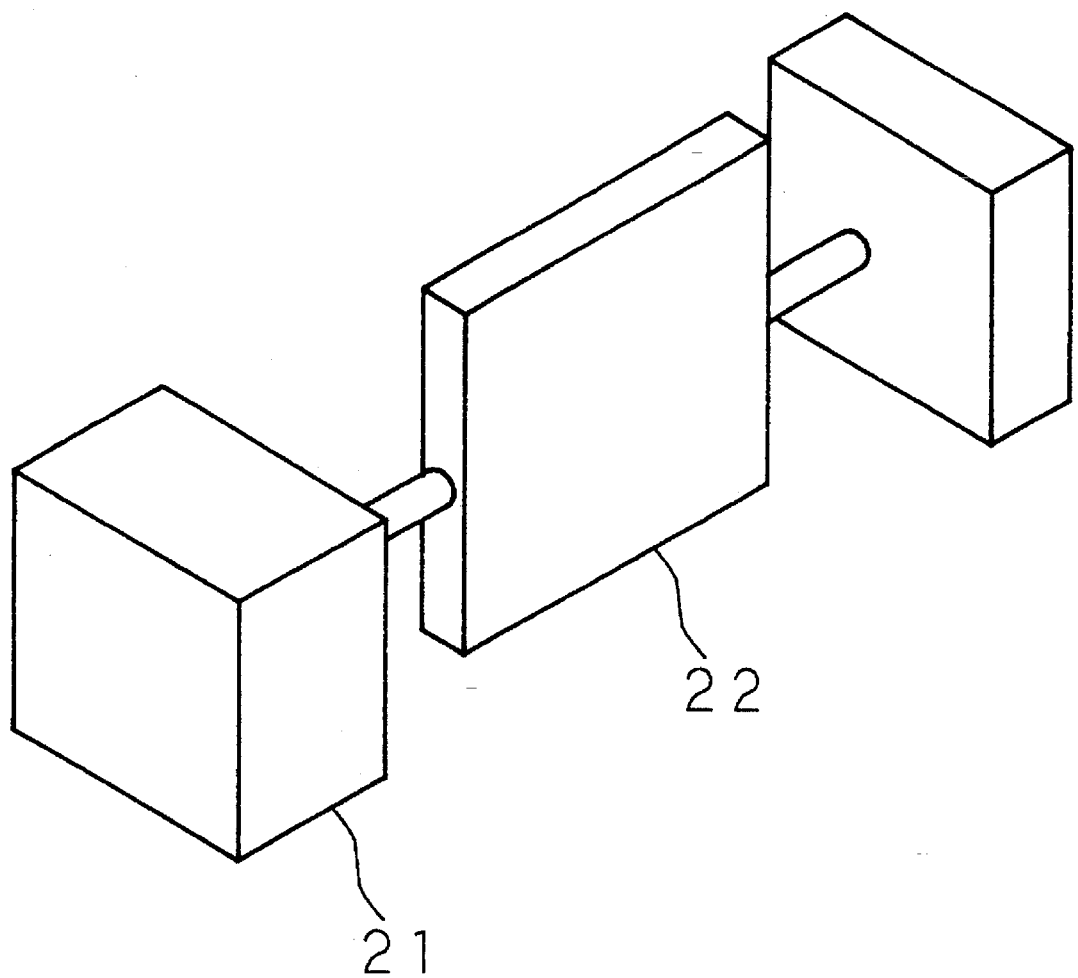
FIG. 7 is a perspective view showing an optical scanning device using a plane reflecting mirror.

FIG. 7 shows an example in which a plane reflecting mirror is used for the optical scanning device 10. A reflecting mirror 22 is revolved by means of a motor 21. There are two possible types of plane reflecting mirror, a single-sided mirror and a double-sided mirror.

Figure 8:
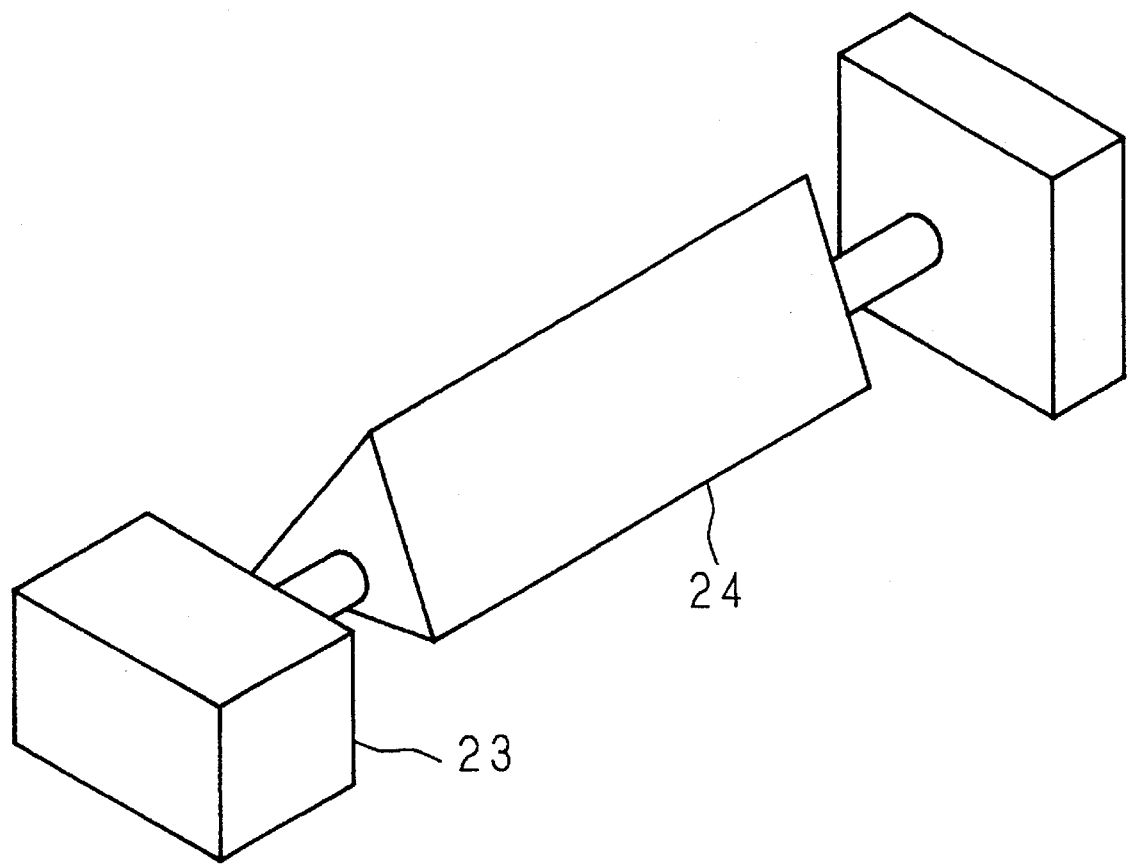
FIG. 8 is a perspective view showing an optical scanning device of triangular columnar shape.
Figure 9:
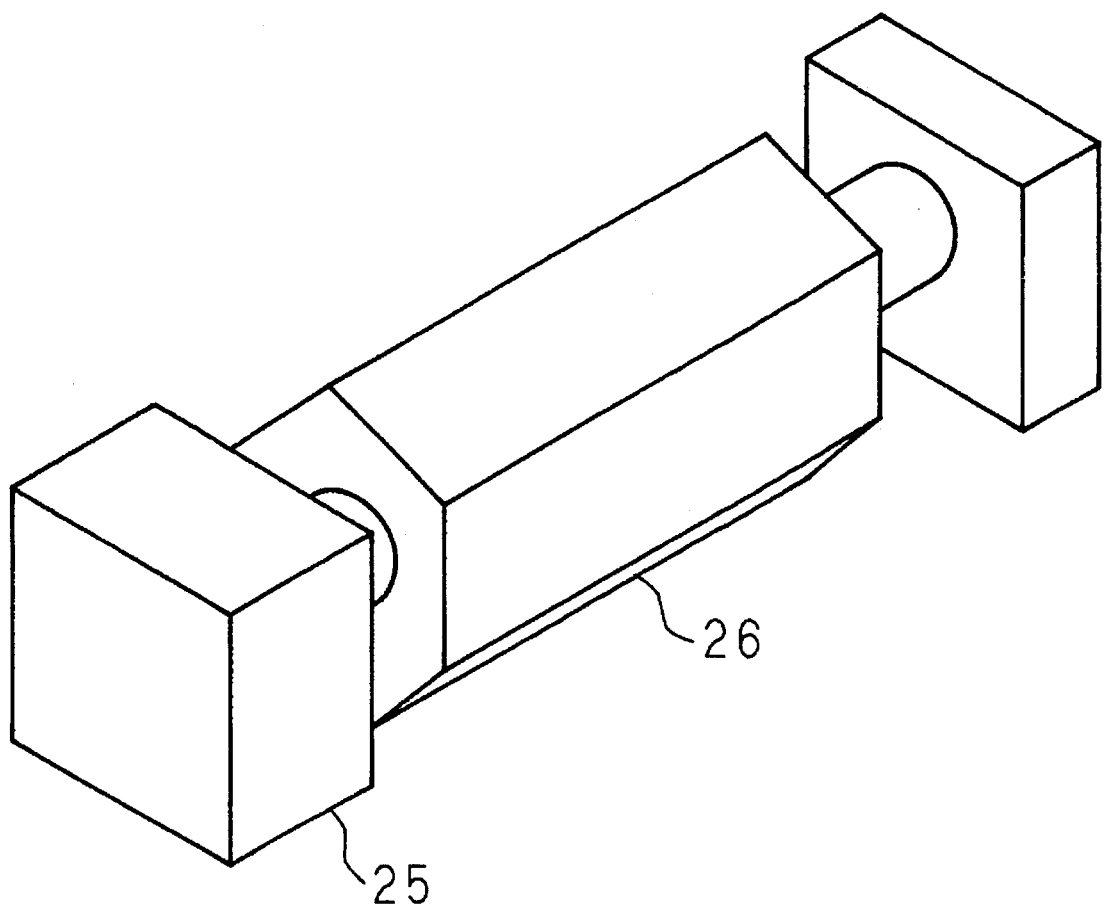
FIG. 9 is a perspective view showing an optical scanning device of polygonal columnar shape.

FIG. 8 shows an example in which a scanning section of triangular columnar shape is used for the optical scanning device 10. A scanning section 24 is revolved by means of a motor 23. FIG. 9 shows an example in which a scanning section of polygonal columnar shape (hexagonal columnar shape) is used for the optical scanning device 10. A scanning section 26 is revolved by means of a motor 25. The optical scanning device 10 does not necessarily have to use a reflecting mirror, but any suitable optical component that reflects light can be used.

By revolving the optical scanning device 10, the angle at which to reflect the light oncoming from the space light modulator 9 can be varied; thus, beams of light from the space light modulator 9 each falling as a line of light can be expanded into an image for display on a two-dimensional surface. Each beam of light reflected by the optical scanning device 10 is directed into an optical path 11 and projected through a magnifying lens 12 onto the display screen 2.

A computer 13 controls the operation of the spatial light modulator 9 via a bus 14 so that portions of the light falling through an optical path 16 are selectively redirected toward the optical scanning device 10 to form an image on the display screen 2. This operation will be described in detail later.

A motor 15 is provided to revolve the optical scanning device 10, the motor 15 being synchronized with the spatial light modulator 9 to ensure proper display of an image. The synchronizing operation is controlled by a controller 20.

Figure 10:
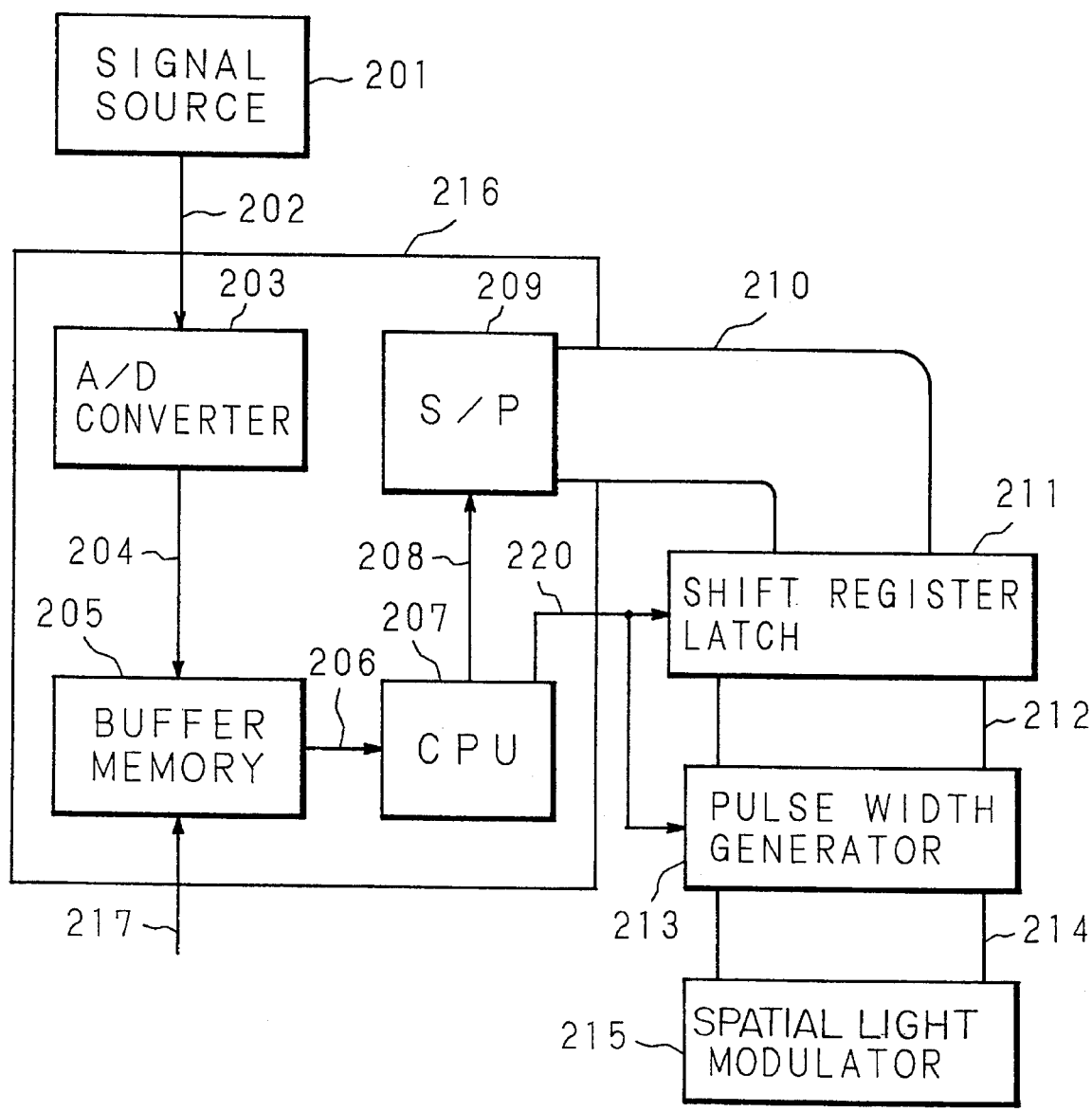
FIG. 10 is a block diagram illustrating the configuration of an electronic optical apparatus for the visual display system of the present invention.

FIG. 10 shows an electronic optical apparatus used for the visual display system. As shown, a signal source 201, for example, a movie, is connected to an electronic optical system 216 via a bus 202. The bus 202 leads to an A/D converter 203. An analog signal fed to the A/D converter 203 via the bus 202 is converted by the A/D converter 203 into a digital code representing the address and luminance signals for each pixel of an image. The digital code is outputted on a bus 204.

The digital code from the A/D converter 203 is transferred via the bus 204 to a buffer memory 205. The digital code is thus stored in the buffer memory 205. In a different mode, such digital code or information can be loaded into the buffer memory 205 from an external computer or graphics system via a bus 217, for example. To enhance the processing capability, the buffer memory 205 may be constructed from a double board or a triple board type memory. Design of a multiple board memory is also known to the industry.

The digital code or information represents an image to be displayed. The digital code stored in the buffer memory 205 is transferred to a central processing unit (CPU) 207 via a bus 206. The CPU 207 is, preferably, a digital signal processing unit (DSP).

The information processed by the CPU 207 is transferred via a bus 208 to a serial/parallel (S/P) converter 209 where the information is divided per address, the divided information then being transferred to a shift register latch 211 via a bus 210. After all address data are inputted to the shift register latch 211 from the S/P converter 209, the shift register latch 211 transfers each address data to a pulse width generator 213 via a bus 212 in accordance with a synchronizing signal fed from the CPU 207 via a bus 220. The pulse width generator 213 converts each address data, transferred via the bus 212, into a pulse width that matches the contents of the data, and transfers the thus converted address data to a spatial light modulator 215 via a bus 214 in accordance with the synchronizing signal fed via the bus 220. The pulse width generator 213 can be incorporated into the CPU 207.

The spatial light modulator 9 has a high speed switching capability and can modulate each pixel of a bright image at a data speed 833 times faster than a CFF. When the desired luminance is at a lower level, the operating speed will become much faster. Luminance of different levels can be obtained by dividing one line display period of the optical scanning device 10 by the necessary number of shades and by having the pulse width generator 213 generate a pulse width that matches the desired luminance.

The spatial light modulator 9 operates at a speed much faster than one line display period. Since this speed is faster than the critical flicker frequency of the human eye, the amount of light sent to the image forming surface for a fixed period is recognized as a variation in luminance.

As described, when compared with the two-dimensional surface type space light modulator of prior art, the above construction of the invention allows the use of an image data shift register or latch of one-dimensional type, and scanning in the vertical direction can be achieved just by controlling the rotation of the optical scanning device 10, which allows a significant reduction in circuitry. Furthermore, in the prior art surface type spatial light modulator, the aspect ratio is fixed at the production stage of the spatial light modulator, but according to the invention, the aspect ratio can be easily varied by varying the rotational speed of the optical scanning device 10. The aspect ratio can be varied without lowering the resolution when the scanning section of the optical scanning device 10 is formed in a shape that allows a wide angle scanning (for example, the number of scanning surfaces is reduced).

Modifications of the above embodiment will now be described.

For example, a color visual display can be achieved by adding filter means to the optical scanning device 10 of FIG. 6.

Optical filters each having the property of reflecting light of a particular frequency or frequency band are disposed on the reflecting surfaces of the optical scanning device 10. Such filters may be formed, for example, from coatings of materials each having the property of reflecting or transmitting light of a particular color band.

In the case of the optical scanning device 10 having the shape shown in FIG. 9, optical filters of red (R), green (G), and blue (B), are placed in a periodic manner. Since the optical scanning device 10 of FIG. 9 has six reflecting surfaces, R, G, B, R, G, and B, two full color scannings take place with one revolution of the optical scanning device 10. The following description deals in detail with the operation of this color visual display.

Referring to FIG. 6, the light 7 emitted from the light source 3 passes through the lenses 4, 5, and 6, and the resulting columnar light 8 hits the space light modulator 9 to which image data are successively fed from the computer 13 via the bus 14. Based on the image data received from the computer 13, the spatial light modulator 9 is operated to selectively move the controllable elements (pixels) to transmit an optical image through the optical path 16 to the optical scanning device 10. The optical image is projected as a line of light onto one of the reflecting surfaces of the optical scanning device 10, for example, an R surface. As the R surface is turned, such lines of light are expanded into a screen image. When one scanning is completed with the R surface, a single colored image of red has been displayed on the display screen 2. Needless to say, the image data supplied to the spatial light modulator 9 from the computer 13 for the production of this image is the screen image data of red.

When the scanning with the R reflecting surface is completed, the next reflecting surface of the optical scanning device 10, i.e. a G reflecting surface, appears. In a similar manner to that for the above R reflecting surface, scanning is performed with the G reflecting surface to produce a screen image of green, and likewise for the next B reflecting surface.

Thus, one screen image is displayed for each component of R, G, and B. The space light modulator 9 and the optical scanning device 10 are synchronized for operation, and the R, G, and B images are successively presented on the screen at a frequency higher than the critical flicker frequency of the human eye, so that the colors are mixed by the human eye to enable the observer to see a completed color image on the display screen 2.

In the foregoing embodiment having the construction shown in FIG. 6, it is also possible to achieve a color display by changing the light source 3.

More specifically, the light source 3 shown in FIG. 6 is replaced by light emitting elements, such as LEDs, that emit lights at the central wavelengths approximately equal to the wavelengths of red, blue, and green colors, respectively. With this arrangement, the light emitting elements, for example, red with 640 nm wavelength, blue with 470 nm wavelength, and green with 570 nm wavelength, are successively switched on to emit lights in the respective colors, thereby achieving a color display as by the previously described optical scanning device using white light in conjunction with the optical filters.

In the foregoing embodiment, the optical scanning device 10 of FIG. 6 constantly revolves at a predetermined speed; when beams of light are constantly supplied from the light source 3, and image data are continuously inputted to the spatial light modulator 9, the image displayed on the display screen 2 will smear in the vertical direction and cannot be properly recognized. Also, a phenomenon will occur in which the continuity of the image is disrupted at the portions corresponding to the joints between the reflecting surfaces of the polygonal optical scanning device 10. Therefore, the light from the light source 3 is pulsed in order to avoid these problems.

First, when one reflecting surface of the optical scanning device 10 comes to an angle at which to start the scanning, the light source 3 turns on a light pulse for the duration of time just equal to one line display period. Next, when the reflecting surface of the optical scanning device 10 is turned to an angle at which to reflect the next line, a light pulse is turned on, again for the duration of time just equal to one line display period. This operation is repeated until the reflecting surface comes to an angle at which to reflect the final line for display. When the scanning of the final line is completed, the light pulse is turned off and remains off until the next reflecting surface of the optical scanning device 10 comes to an angle at which to start the scanning. By repeating the above operations, a proper image can be displayed without causing image lines to smear and without displaying unwanted image portions during the horizontal retrace periods. The emitting operation of such light pulses is controlled by the controller 20.

Figure 11:
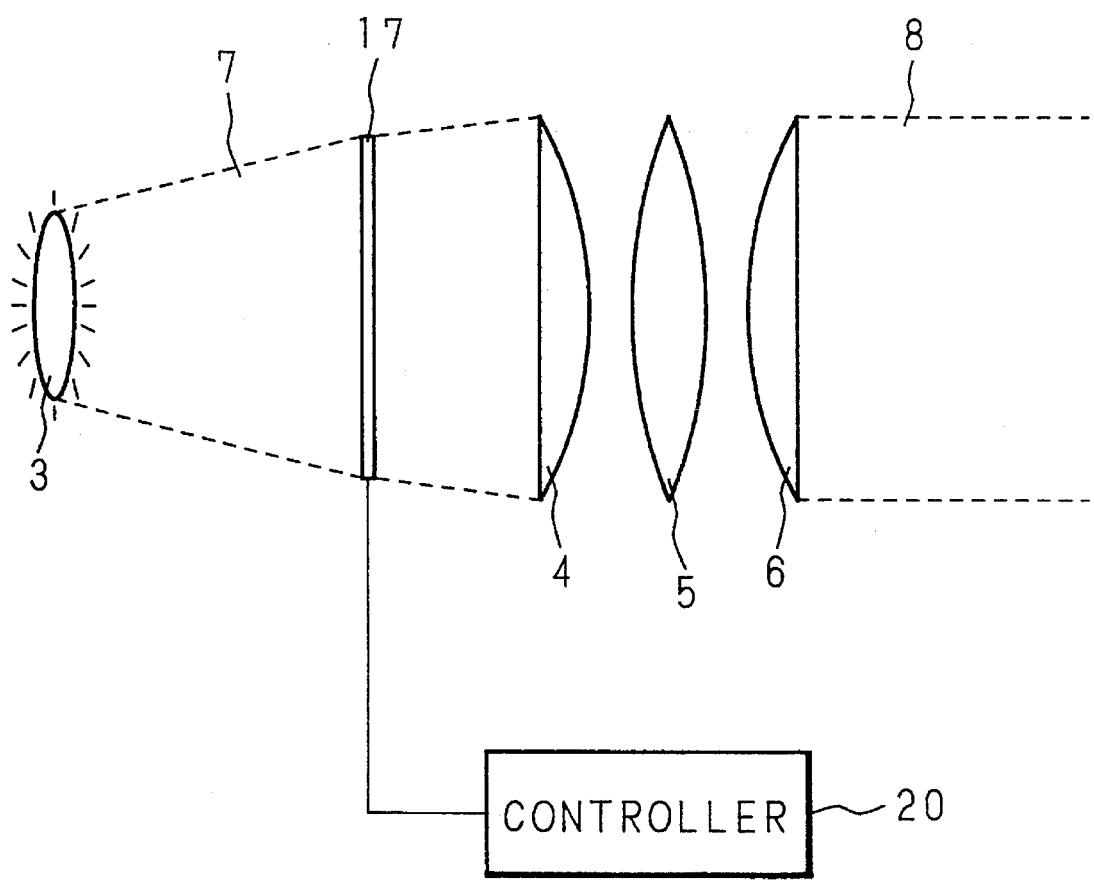
FIG. 11 is a schematic diagram illustrating an alternative construction of the part of the visual display system of the present invention.

Instead of adapting the light source 3 to emit light pulses, an optical shutter 17 may be provided between the light source 3 and the lens 4, as shown in FIG. 11, to attain the same effect as described above. The optical shutter 17 is operated to open for the ON period and close for the OFF period, with the same on/off timing of the light pulse. The actuation of the optical shutter 17 is controlled by the controller 20.

In the foregoing embodiment, image line smearing can be prevented by employing, as the motor 15 for controlling the optical scanning device 10, a stepper motor having a step angle equivalent to the angle through which the optical scanning device 10 scans across the width of the controllable elements of the spatial light modulator 9.

In addition, the rotating speed of the optical scanning device 10 needs to be synchronized with the timing of the image data sent from the computer 13 to the spatial light modulator 9 and the timing of the light pulse or the optical shutter 17. Such synchronizing operation is controlled by the controller 20.

Figure 12:
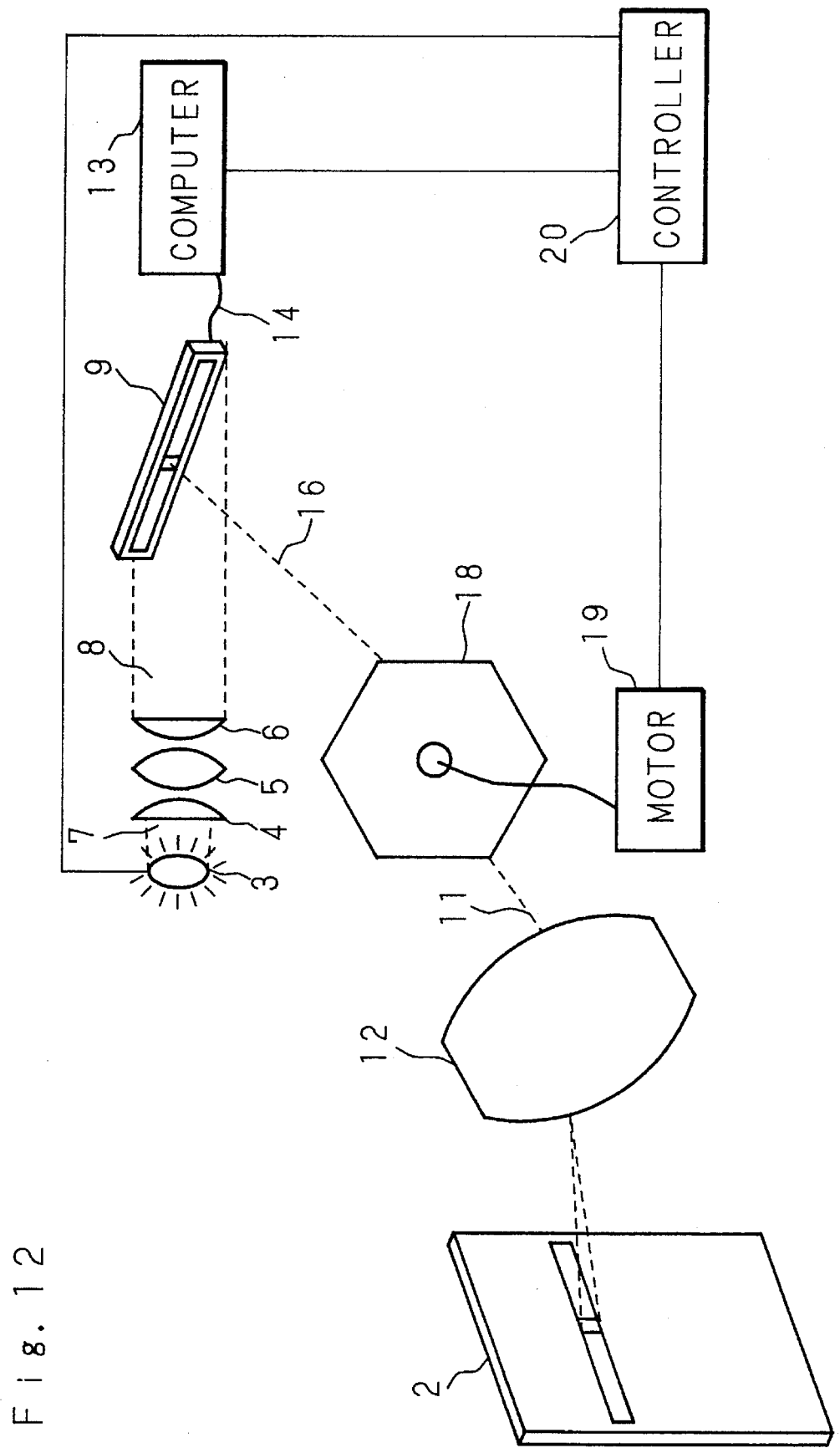
FIG. 12 is a schematic diagram illustrating a further alternative construction of the visual display system of the present invention.

In the foregoing embodiment, reflecting mirrors are used in the optical scanning device 10, but instead, a prism may be used. FIG. 12 is a schematic diagram illustrating an alternative construction of the embodiment wherein an optical scanning device 18 consisting of a prism is used. The optical scanning device 18 shown is constructed from a hexagonal refracting prism, but it will be appreciated that a triangular prism or lens of the shape shown in FIG. 8 or a polygonal prism or lens of the shape shown in FIG. 9 may be used to serve the purpose. The optical scanning device 18 is revolved by means of a motor 19. The motor 19 is driven to revolve a scanning section of the optical scanning device 18 to vary the angle of incidence of the image light projected through the optical path 16, thus enabling the scanning to be performed by varying the direction of refraction. Otherwise, the construction of FIG. 12 is identical to that of FIG. 6; therefore, the same reference numerals are assigned to the same parts, and their descriptions ape omitted herein.

As described above, according to the visual display system of the invention, since the spatial light modulator is constructed by arranging the controllable elements in a line, the system is inexpensive to construct, addressing circuitry for the controllable elements and electrical circuitry for light modulation can be simplified, and the aspect ratio can be varied easily.

Figure 13:
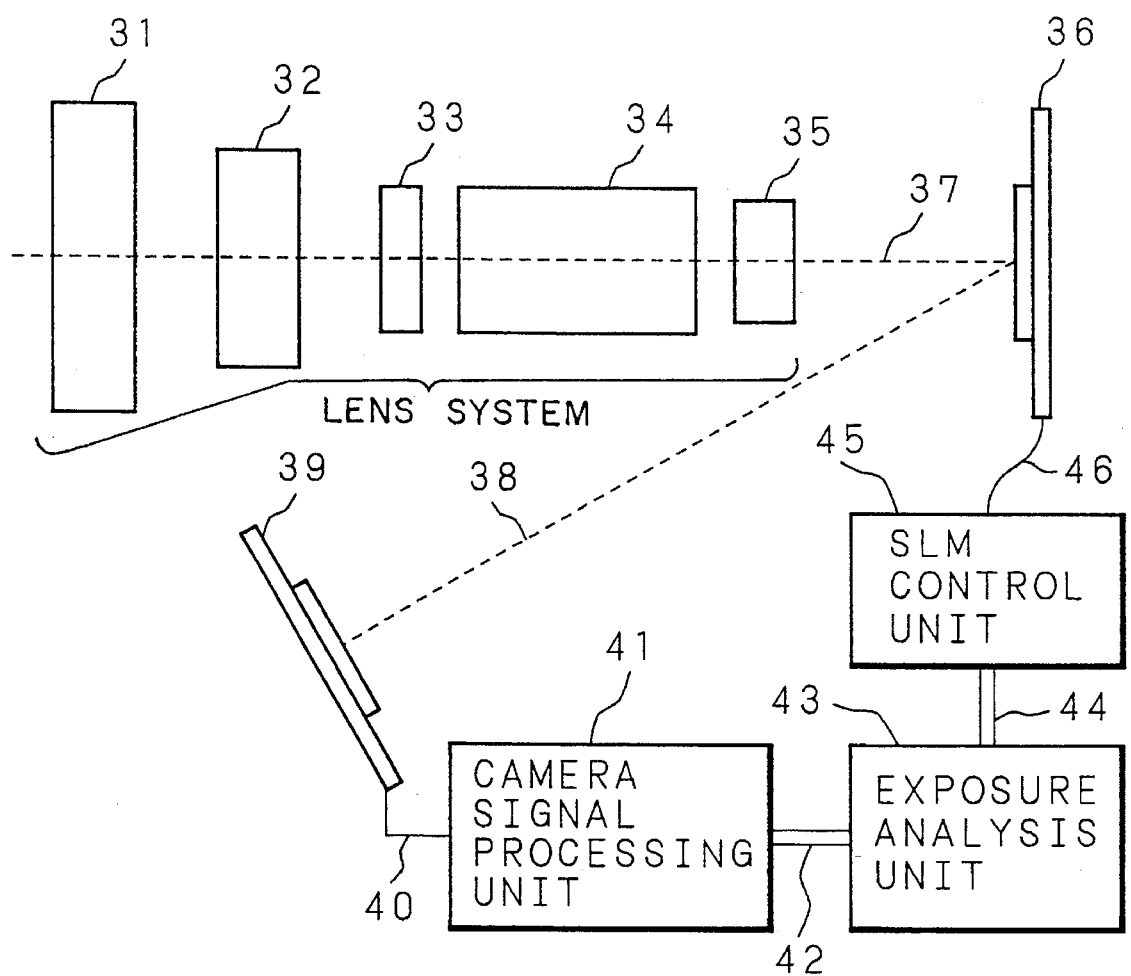
FIG. 13 is a schematic diagram illustrating the construction of an exposure control apparatus according to the present invention.

FIG. 13 is a diagram illustrating the construction of an exposure control apparatus using a spatial light modulator 36, according to the invention. Image light, first enters a lens system 31, then passes through lens systems 32, 33, 34, 35, and through an optical path 37, to reach the spatial light modulator 36. Of these lens systems, 31 is, for example, a focusing section, 32 is a variator, 33 is a compensator, 34 is a master lens, and 35 is an optical filter.

In this embodiment, the spatial light modulator 36 is of the type generally known as a deformable mirror device (DMD), which will be described hereinafter. A spatial light modulator of other type may be used if it is capable of changing the directions of individual light beams at sufficiently high speed. A photoelectric conversion device 39 is of the type generally known as the CCD. A photoelectric conversion device of other type may be used if it is capable of converting image light into electrical signals at sufficiently high speed.

Figure 14:
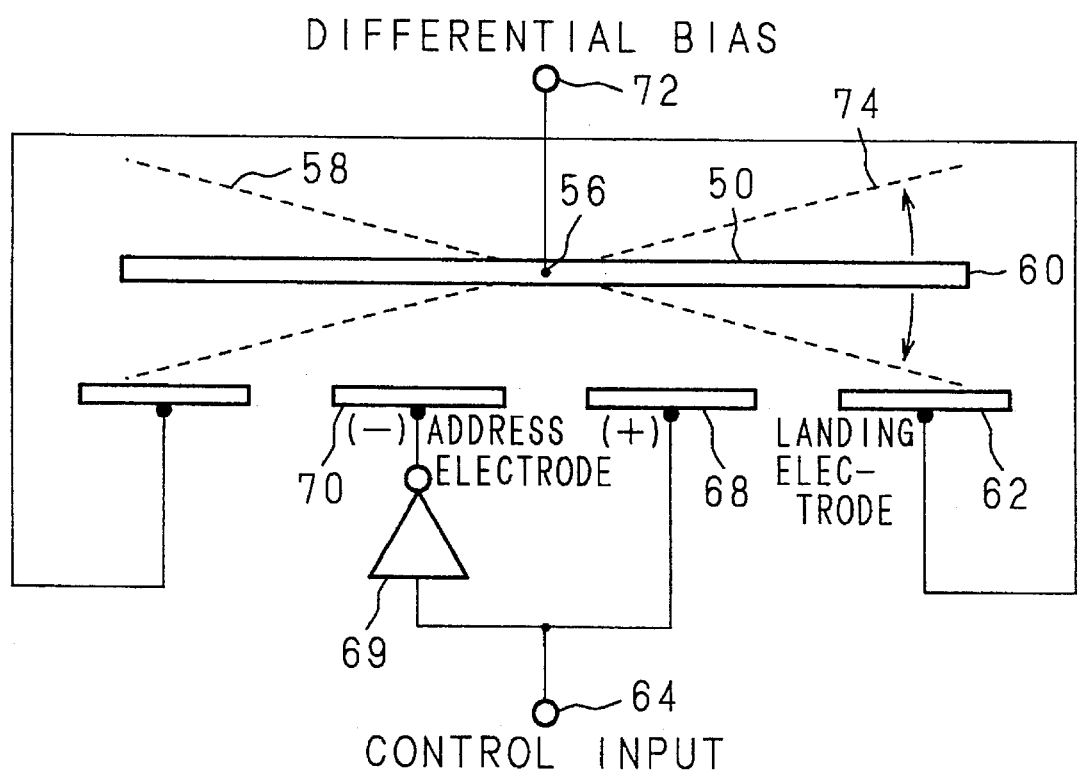
FIG. 14 is a schematic diagram illustrating the construction of a spatial light modulator.

FIG. 14 shows the construction of the spatial light modulator 36. A mirror 50 mounted in a vertical plane 60 is movable about a shaft 56 between the positions indicated by dotted lines 58 and 74. In the position of ON state, one edge of the mirror 50 is in contact with a landing electrode 62. When a suitable voltage is applied to a control input 64, the mirror 50 is moved to the ON position. The voltage applied to the control input 64 is inputted to a positive electrode 68, and through an inverter 69 to a negative electrode 70. A differential bias is applied to the mirror 50 through an electrode 72. When the mirror 50 is in the position indicated by dotted line 58, the whole or part of the image light introduced through a first optical path 37 is guided to a second optical path 38. In the OFF state, the mirror 50 is turned to the position indicated by dotted line 74 by applying a negative voltage to the vertical plane 60 or to the control input 64, so that the image light will not be guided to the second optical path 38. The space light modulator 36 consists of the mirrors 50 arranged in a two-dimensional matrix array. The mirrors 50 can be controlled individually and simultaneously.

By controlling the controllable elements of the spatial light modulator 36, the beam of light that has reached the spatial light modulator 36 after passing through the lens systems and the first optical path 37 is directed along the second optical path 38 to the photoelectric conversion device 39. The photoelectric conversion device 39 converts the entering light into electrical signals. By using these electrical signals, the controllable elements are controlled to vary the amount of light to be supplied to the photoelectric conversion device 39, that is, the spatial light modulator 36 acts as an optical diaphragm. Realtime control of the diaphragm can be performed by converting and analyzing the electrical signals outputted from the photoelectric conversion device 39 and feeding the information back to the spatial light modulator 36.

Each electrical signal outputted from the photoelectric conversion device 39 is supplied via a bus 40 to a camera signal processing unit 41 which converts the electrical signal into an image signal. The image signal is then fed via a bus 42 to an exposure analysis unit 43 which analyzes the image signal to determine, for example, the luminance level of the entire screen, the presence or absence of pixels that have reached the luminance saturation level, and the addresses of such pixels. Next, using the analyzed data, the mode of control of the spatial light modulator 36 is determined, and the resulting control signal is sent to an SLM control unit 45 via a bus 44. Based on the control signal, the SLM control unit 45 operates the controllable elements of the spatial light modulator 36 via a bus 46, to reduce the proportion of the image light guided to the second optical path 38.

Figure 15:
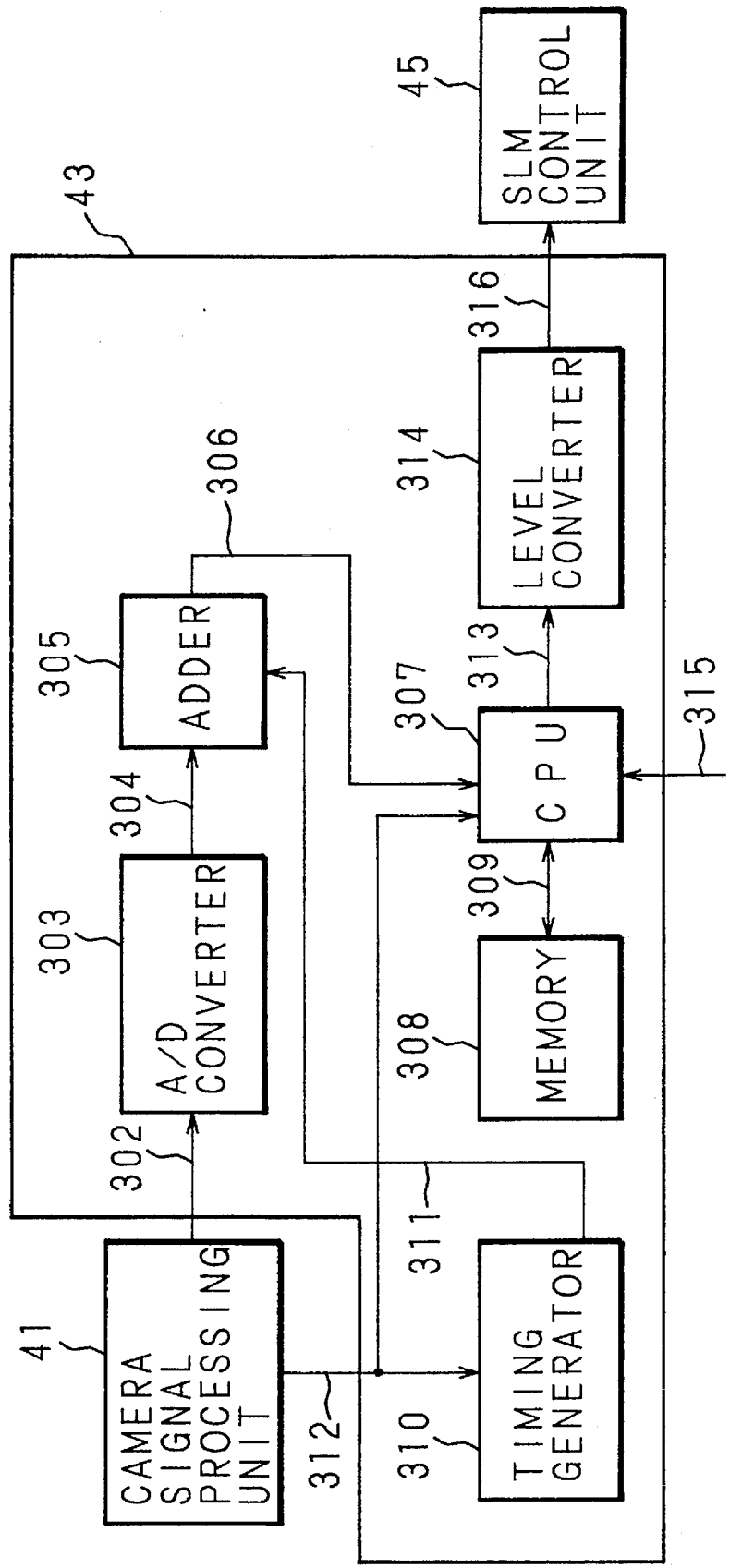
FIG. 15 is a block diagram illustrating the configuration of an exposure analysis unit.

Depending on how the internal processing is performed, the exposure analysis unit 43 can operate the spatial light modulator 36 as an optical diaphragm in various ways. FIG. 15 shows the internal configuration of the exposure analysis unit 43. A signal transferred from the photoelectric conversion device 39 is converted by the camera signal processing unit 41 into an image signal. The image signal is transferred via a bus 302 to an A/D converter 303, internal to the exposure analysis unit 43, for analog-to-digital conversion. The converted signal is then fed to an adder 305 via a bus 304. In the meantime, a synchronizing signal, which is outputted from an SSG internal to the camera signal processing unit 41, is transferred to a timing generator 310 and a CPU 307 via a bus 312. Based on this synchronizing signal, the timing generator 310 produces a timing signal for the adder 305. Using the timing signal fed from the timing generator 310 via a bus 311, the adder 305 performs addition on the signal transferred via the bus 304. The value of the sum is proportional to the luminance of the sampled image. This value is transferred to the CPU 307 via a bus 306. The CPU 307 compares this value with a predetermined reference value and sends the resulting signal to a level converter 314 via a bus 313. The reference value can be set externally via a bus 315. The detailed processing performed by the CPU 307 will be described later.

Based on the signal supplied from the CPU 307, the level converter 314 determines the amount of image light to be supplied from the spatial light modulator 36 to the photoelectric conversion device 39, and sends the resulting control signal to the SLM control unit 45 via a bus 316. The level converter 314 may be incorporated into the CPU 307.

Figure 16:
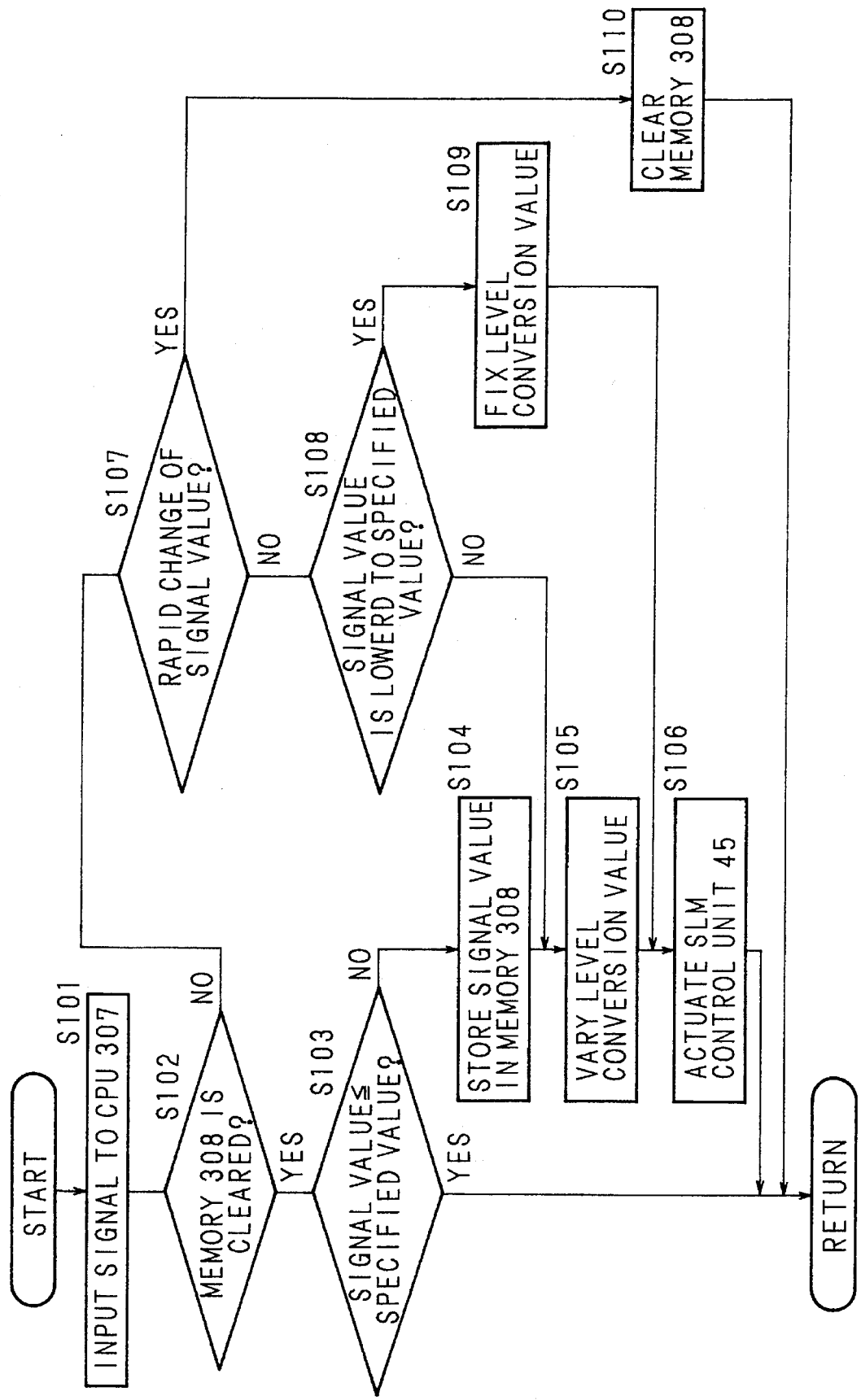
FIG. 16 is a flowchart illustrating a sequence of operations within a CPU.

FIG. 16 is a flowchart showing the image signal flow performed by the system in which the level converter is incorporated into the CPU 307. The signal outputted from the photoelectric conversion device 39 is processed through the camera signal processing unit 41, A/D converter 303, and adder 305, and is inputted to the CPU 307 (step S101). First, it is determined whether a memory 308 is cleared or not (step S102). In the beginning, since the memory 308 is cleared, the answer is YES, and the process proceeds to step S103. In step S103, it is determined whether the value of the signal (luminance of the image) sent from the adder 305 is within the specified luminance value. If the signal value is not great than the specified value, the answer is YES, and no instruction is given to the SLM control unit 45.

On the other hand, if the signal value is greater than the specified value, the signal value is stored into the memory 308 via a bus 309 (step S104), the level conversion value is varied (step S105), and the SLM control unit 45 is actuated (step S106). When the SLM control unit 45 is actuated, the amount of light to be supplied to the photoelectric conversion device 39 is varied. The resulting signal from the photoelectric conversion device 39 is delivered through the camera signal processing unit 41, A/D converter 303, and adder 305, and is inputted again to the CPU 307 (step S101). In the next step S102, since the memory 308 is not cleared, the answer is NO, and the process proceeds to step S107. In step S107, it is determined whether there has been a rapid change in the signal value. A rapid change will mean a change from one image scene to the next. If there is no rapid change, the answer is NO, and the process proceeds to step S108. In step S108, it is determined whether the signal value has dropped to the specified value with which the value stored in the memory 308 was compared. If not, the level conversion value is further varied (step S105), and the SLM control unit 45 is again actuated (step S106). On the other hand, if it is determined that the signal value has dropped to the specified value, the level conversion value is fixed to the current level (step S109), and the SLM control unit 45 is allowed to operate with the current level (step S106). If there has been a rapid change in the signal value fed from the photoelectric conversion device 39 (YES in step S107), the value in the memory 308 is cleared (step S110), and the level conversion value is initialized. Control of the diaphragm is performed by repeating the above sequence of operations.

In the exposure analysis unit of the above embodiment, the spatial light modulator is controlled by using the mean luminance of the whole screen, and is made to serve the same function as a conventional diaphragm, but it is also possible to suppress the luminance only for the portions where the luminance is saturated or where the luminance exceeds the threshold level. An exposure analysis unit so adapted will now be described.

Figure 17:
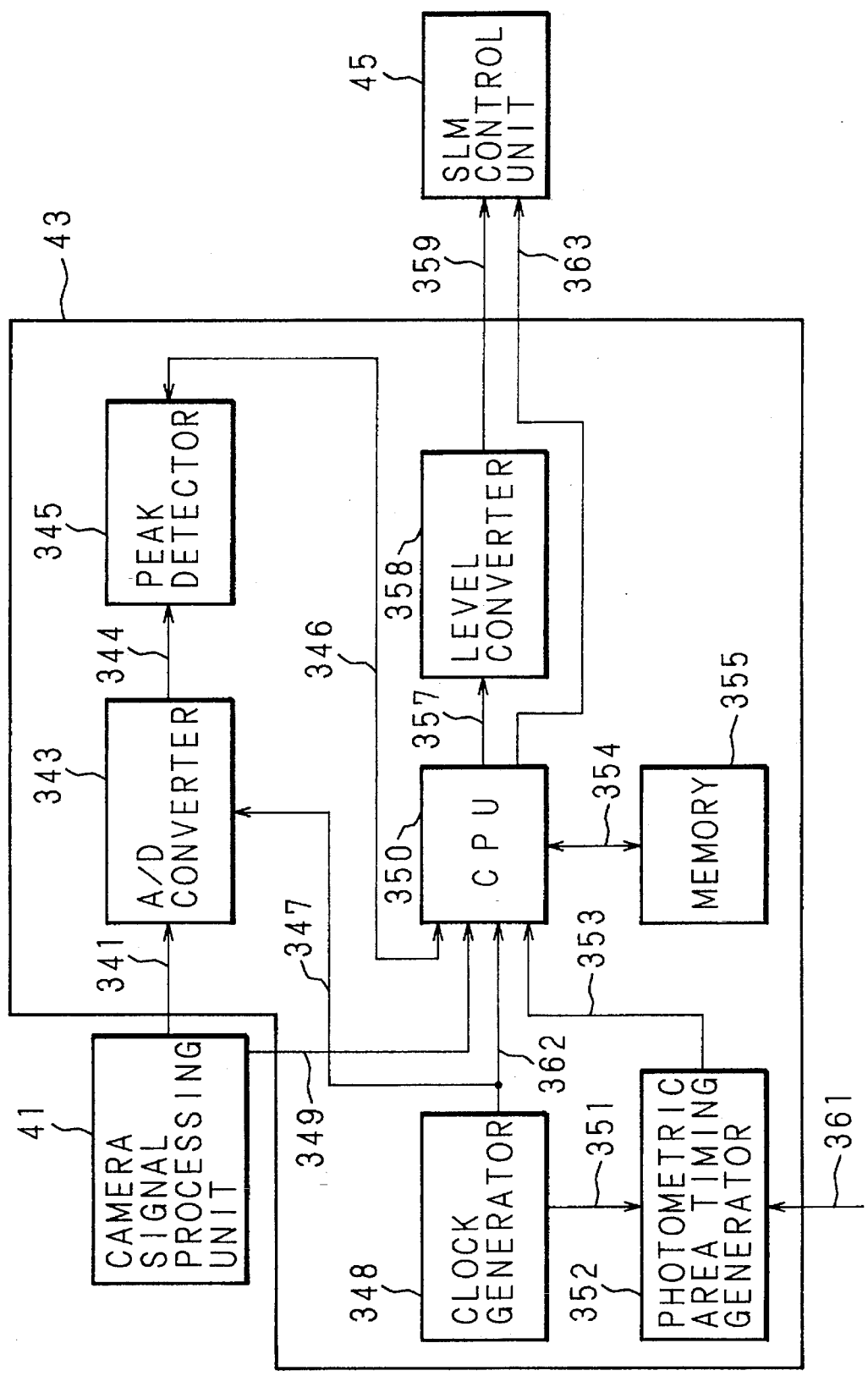
FIG. 17 is a block diagram illustrating an alternative configuration of the exposure analysis unit.
Figure 18:
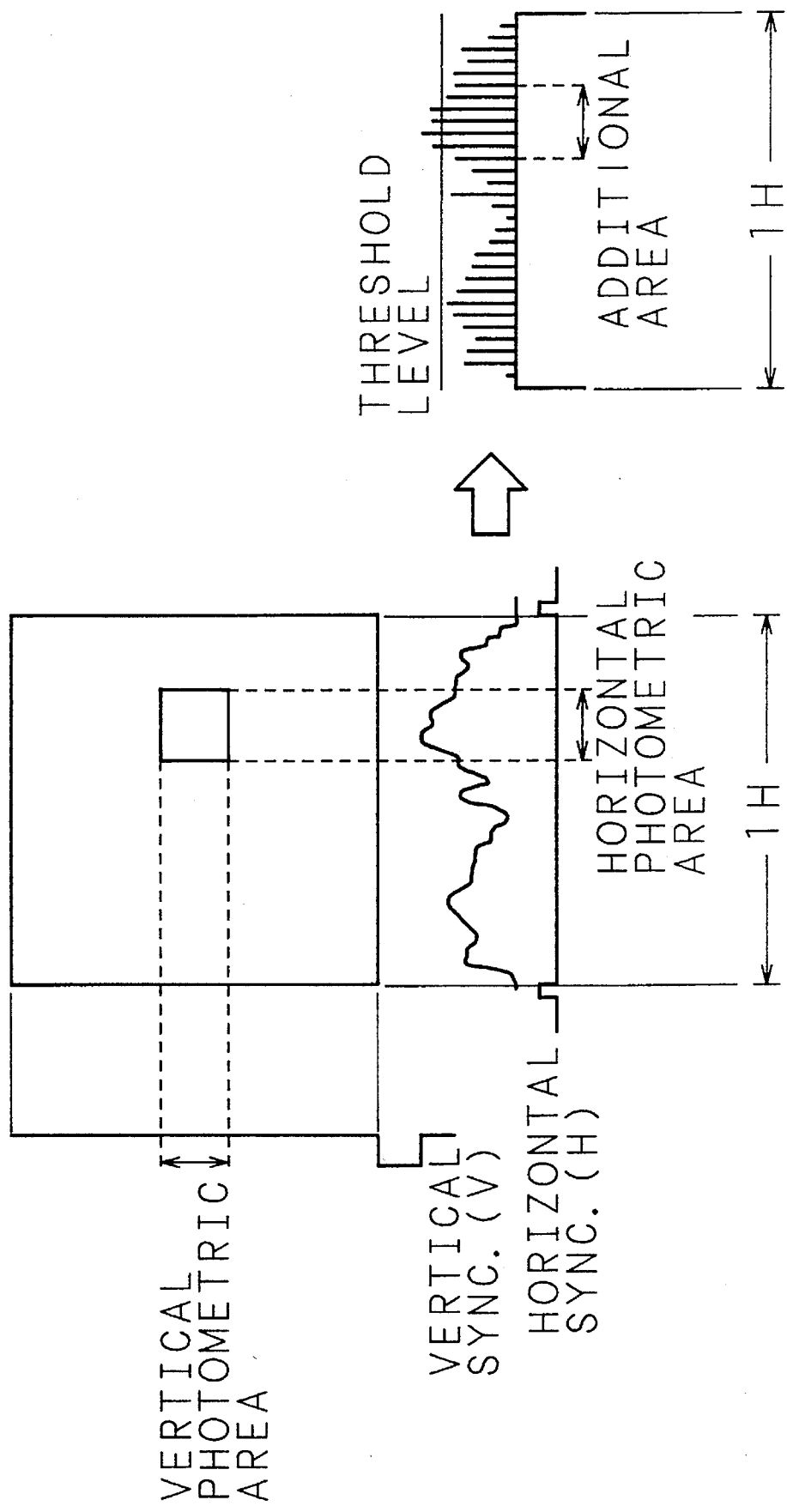
FIG. 18 is a graph showing the relationship of a photometric area relative to an image signal and A/D converted signal.

FIG. 17 is a block diagram illustrating the configuration of such an exposure analysis unit, and FIG. 18 is a graph showing the relationship of the image forming surface and photometric area of the photoelectric conversion device relative to tile input image signal and A/D converted signal. As in the foregoing embodiment, the image signal outputted from the camera signal processing unit 41 is transferred via a bus 341 to the exposure analysis unit 43. The image signal supplied to the exposure analysis unit 43 is inputted to an A/D converter 343 for analog-to-digital conversion. The operation of A/D converter 343 is controlled by a clock signal given from a clock generator 348 via a bus 347. The converted signal is fed to a peak detector 345 via a bus 344. The peak detector 345 compares the signal with the threshold level set by a CPU 350, and if the signal is greater than the threshold level, transfers the signal to the CPU 350 via a bus 346.

Inputted to the CPU 350 are a synchronizing signal, which is given from the camera signal processing unit 41 via a bus 346; a clock signal, which is given from the clock generator 348 via a bus 362; and a photometric area signal, which is given via a bus 353 from a photometric area timing generator 352 whose operation is synchronized with the clock signal supplied via a bus 351 from the clock generator 348. The photometric area for the photometric area timing generator 352 can be changed via a bus 361.

The signal transferred to the CPU 350 from the peak detector 345 is stored via a bus 354 into a memory 355, together with the address calculated from the photometric area signal supplied from the photometric area timing generator 352 and the synchronizing signal supplied from the camera signal processing unit 41. The CPU 350 also supplies a level signal to a level converter 358 via a bus 357, the level signal corresponding to the overlevel portion of the signal sent from the peak detector 345, and transfers the address of the pixel where the overlevel is caused, to the SLM control unit 45 via a bus 363.

Based on the signal sent from the CPU 350, the level converter 358 determines the amount of image light to be supplied from the spatial light modulator 36 to the photoelectric conversion device 39, and supplies the resulting data signal to the SLM control unit 45 via a bus 359. The level converter 358 may be incorporated into the CPU 350.

Figure 19:
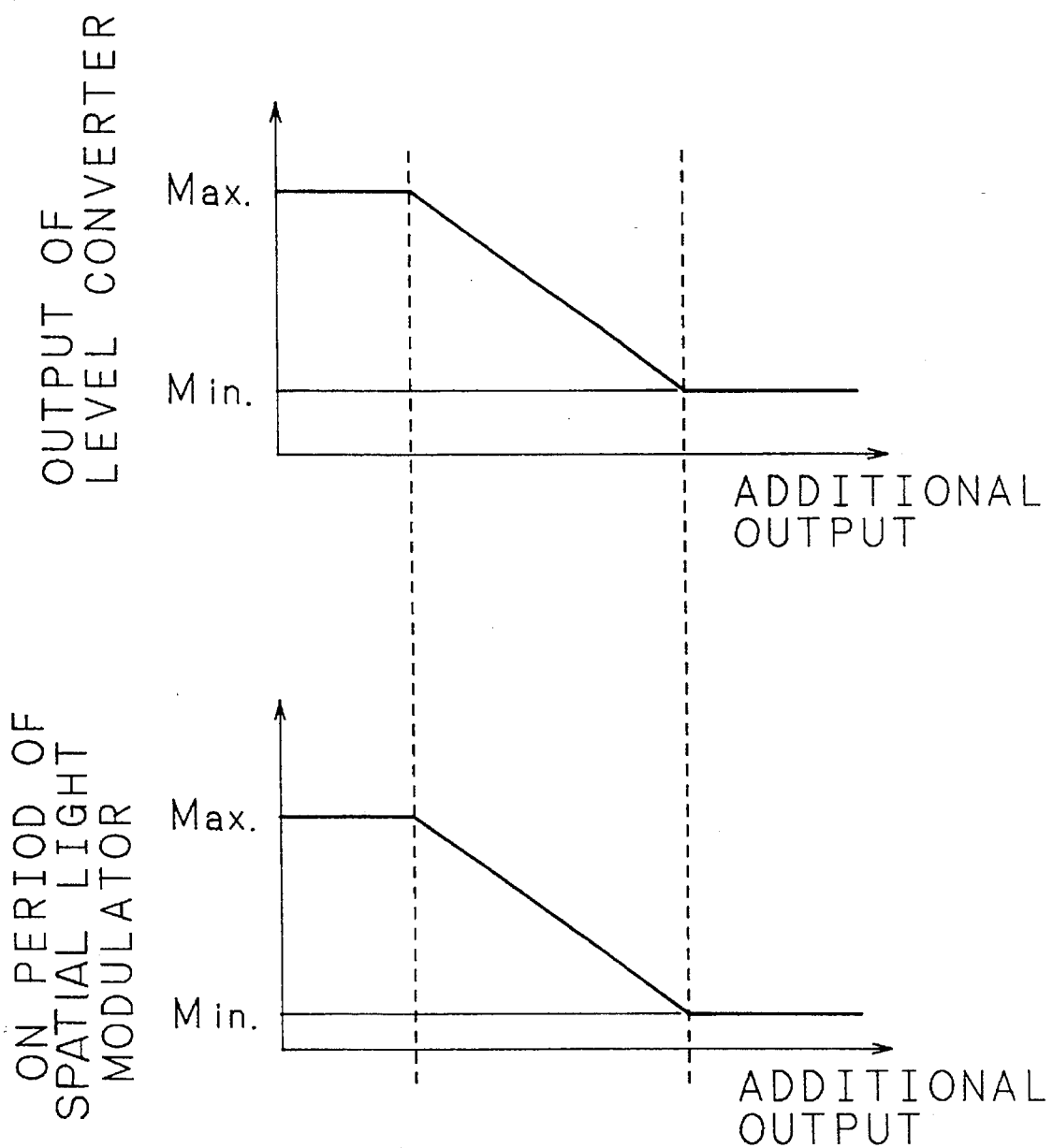
FIG. 19 are graphs showing the relationship of an adder output relative to a level converter output and an ON period of the spatial light modulator.

FIG. 19 shows an example of the relationship of the adder output relative to the level converter output and the ON period of the spatial light modulator. As shown, when the adder output is small, the level converter output is large, that is, the ON period of the spatial light modulator is long. Next, in the region to the right of the left-hand side dotted line, the CPU operates to lower the level converter output and reduce the ON period of the spatial light modulator. When the adder output is further increased past the right-hand side dotted line which represents the threshold level, the level converter output is maintained at a minimum level. The rate of variation over the region between the two dotted lines, i.e. the section where the level converter output is varied, can be set at a desired value. The variation may be either continuous or in discrete steps.

Next, an embodiment of an exposure control apparatus equipped with a function of an image projector will be described below.

Figure 20:
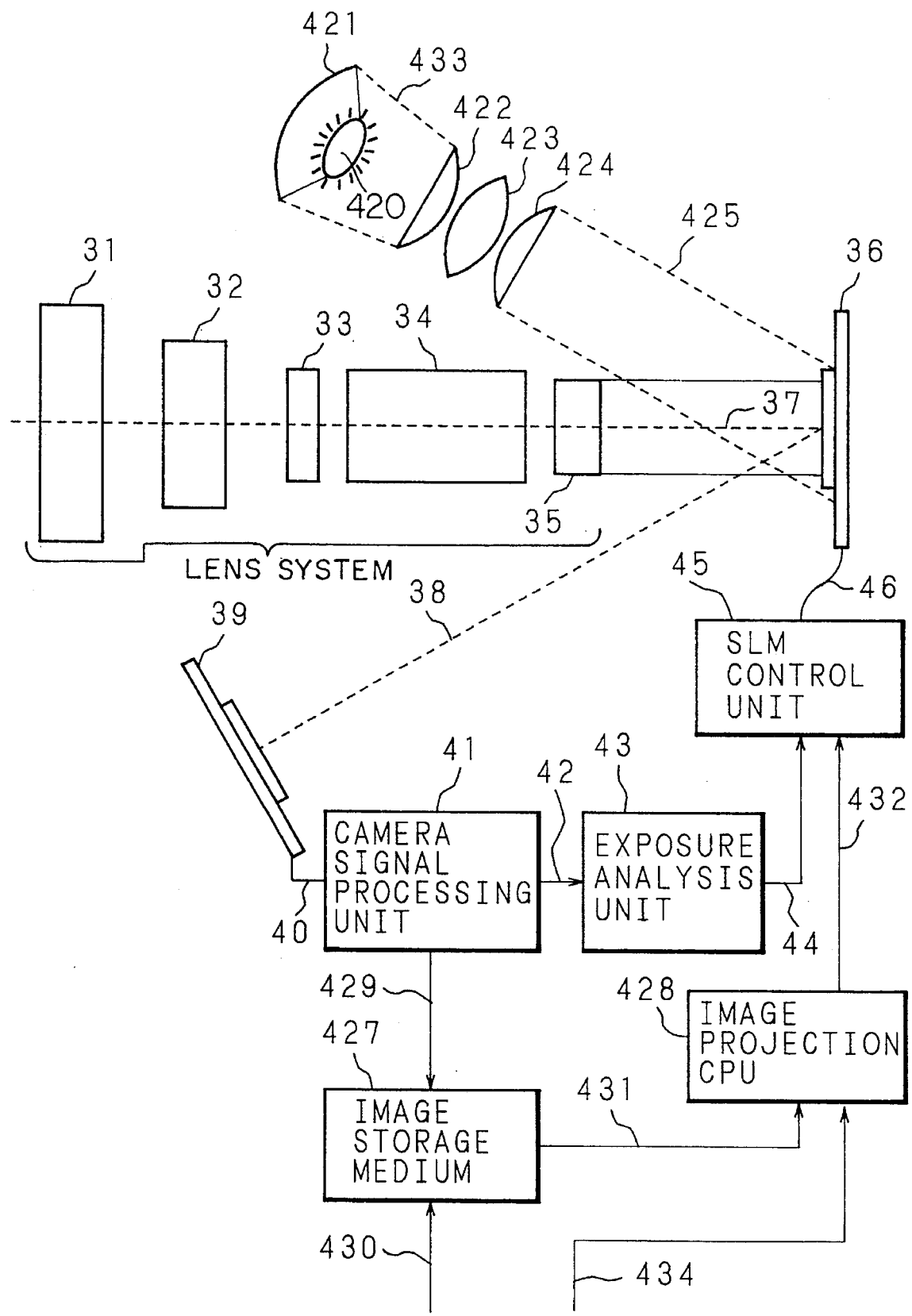
FIG. 20 is a schematic diagram illustrating an alternative construction of the exposure control apparatus of the present invention.

FIG. 20 is a schematic diagram illustrating the construction of such an exposure control apparatus. In FIG. 20, the same parts as those in FIG. 13 are designated by the same reference numerals. Since the exposure control mechanism is identical to that of the foregoing embodiment, the following description deals only with the image projection function.

Referring to FIG. 20, light emitted from a light source 420 is collected by a reflecting mirror 421 and reflected through an optical path 433 into a lens 422. The lenses 422, 423, and 424 together form a beam columnator which acts to collimate the entering light into a beam of light shown as an optical path 425. The beam of light is projected through the optical path 425, a fourth optical path, onto the spatial light modulator 36. In this embodiment, the space light modulator 36 is in the ON state when it is placed in the position indicated by the dotted line 74 in FIG. 14, which is the OFF state in the case of exposure control, or more particularly, when a negative voltage is applied to the control input 64.

An image storage medium 427 is provided to store an image signal sent from the camera signal processing unit 41 via a bus 429 or an external image signal sent via a bus 430. The image signal is transferred to an image projection CPU 428 via a bus 431. An image signal can be directly inputted to the image projection CPU 428 via a bus 434. The image projection CPU 428 converts the input image signal to data suitable for image display by the spatial light modulator 36, and delivers the data via a bus 432 to the SLM control unit 45 to control the space light modulator 36. The individual controllable elements of the spatial light modulator 36 are controlled by the data supplied via the bus 46 so that an image is formed on the surfaces of the controllable elements.

The light passed through the fourth optical path (the optical path 425) strikes the spatial light modulator 36 on which the image is formed, and the image light is reflected into the optical path 37, a third optical path, and passed through the lens systems 35, 34, 33, 32, and 31 for enlarged image projection.

As described, the exposure control apparatus of the invention uses the spatial light modulator for exposure control; therefore, the number of mechanical moving parts is reduced, the mechanism is simplified, and partial exposure control can be performed. It is also possible to project an image for display by forming an image on the spatial light modulator and projecting light thereon from the light source.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An exposure control apparatus comprising:

a lens system;

a spatial light modulator receiving light passing through said lens system and having a plurality of controllable elements;

a photoelectric conversion device for converting said received light reflected from said spatial light modulator into an electrical signal; and control means for controlling, individually and simultaneously, the plurality of controllable elements of said spatial light modulator on the basis of the output from said photoelectric conversion device, in order to switch the states of the controllable elements between a first state, in which at least a portion of said received light is guided to said photoelectric conversion device, and a second state in which said received light is not guided to said photoelectric conversion device.

2. The exposure control apparatus set forth in claim 1, wherein said plurality of controllable elements are a plurality of reflective members.

3. An exposure control apparatus comprising:

a lens for focusing image light representing an image;

a spatial light modulator receiving said image light and having a plurality of controllable elements;

a photoelectric conversion device for converting said received image light reflected from said spatial light modulator into an electrical signal;

exposure analysis means for calculating a luminance level of said image as a whole based on said electrical signal output by said photoelectric conversion device; and control means for controlling, individually and simultaneously, the plurality of controllable elements of said spatial light modulator based on an output of said exposure analysis means, in order to switch the states of the controllable elements between a first state, in which at least a portion of said received image light is guided to said photoelectric conversion device, and a second state in which said received image light is not guided to said photoelectric conversion device.

4. The exposure control apparatus set forth in claim 3, wherein said plurality of controllable elements are a plurality of reflective members.

5. An exposure control apparatus as set forth in claim 3, wherein said exposure analysis means calculates a luminance level of said image as a whole based on said electrical signal, and compares said luminance level to a predetermined threshold; and said control means changes states of a number of said controllable elements based on the results of said comparison performed by said exposure analysis means.

6. A method of controlling image exposure, comprising the step of:

(a) focusing image light, representing an image, on a spatial light modulator, said spatial light modulator having a plurality of controllable elements;

(b) converting said image light reflected by said spatial light modulator and received by a photoelectric conversion device into an electrical signal;

(c) calculating a luminance level of said image as a whole based on said electrical signal; and (d) individually controlling said plurality of controllable elements based on output of said step (c) to switch at least a portion of said plurality of controllable elements between a first state, in which said image light is guided to said photoelectric device, and a second state, in which said image light is not guided to said photoelectric device.

7. A method of exposure control as set forth in claim 5, wherein said step (c) further comprises the step of (c1) comparing said luminance level to a predetermined threshold, and (c2) outputting a control signal to said spatial light modulator based on output of said step (c1); and said step (d) comprises the step of (d1) changing states of a number of said controllable elements based on said control signal.

8. The exposure control apparatus set forth in claim 6, wherein said plurality of controllable elements are a plurality of reflective members.

9. A method of controlling image exposure, comprising the step of:

(a) focusing image light, representing an image, on a spatial light modulator, said spatial light modulator having a plurality of controllable elements;

(b) converting said image light reflected by said spatial light modulator and received by a photoelectric conversion device into an electrical signal;

(c) calculating a luminance level of a part of said image based on said electrical signal; and (d) individually controlling said plurality of controllable elements based on output of said step (c) to switch said plurality of controllable elements between a first state, in which at least a portion of said image light is guided to said photoelectric device, and a second state, in which said image light is not guided to said photoelectric device.

10. A method of exposure control as set forth in claim 9, wherein said step (c) further comprises the step of (c1) comparing said luminance level to a predetermined threshold, and (c2) outputting a control signal to said spatial light modulator based on output of said step (c1), said output signal designating said part of said image; and said step (d) comprises the step of (d1) changing states of a number of said controllable elements corresponding to said part of said image based on said control signal.

11. The exposure control apparatus set forth in claim 9, wherein said plurality of controllable elements are a plurality of reflective members.

12. An exposure control apparatus comprising:

a lens for focusing image light representing an image;

a spatial light modulator receiving said image light and having a plurality of controllable elements;

a photoelectric conversion device for converting said image light reflected by said spatial light modulator into an electrical signal;

exposure analysis means for calculating a luminance level of a part of said image based on said electrical signal output by said photoelectric conversion device; and control means for controlling, individually and simultaneously, the plurality of controllable elements of said spatial light modulator based on output of said exposure analysis means, in order to switch the states of the controllable elements between a first state, in which at least a portion of said received image light is guided to said photoelectric conversion device, and a second state in which said received image light is not guided to said photoelectric conversion device.

13. An exposure control apparatus as set forth in claim 12, wherein said exposure analysis means calculates a luminance level of a part of said image based on said electrical signal, compares said luminance level to a predetermined threshold, and outputs an address signal designating said part of said image; and said control means changing states of a number of said controllable elements corresponding to said part of said image based on results of said comparison and said address signal.

14. The exposure control apparatus set forth in claim 12, wherein said plurality of controllable elements are a plurality of reflective members.

15. An exposure control apparatus comprising:

a lens system;

a spatial light modulator receiving light passing through said lens system and having a plurality of controllable elements;

a photoelectric conversion device for converting said received light reflected from said spatial light modulator into an electrical signal; and control means for controlling, individually and simultaneously, the plurality of controllable elements of said spatial light modulator on the basis of said electrical signal.

16. The exposure control apparatus set forth in claim 15, wherein said plurality of controllable elements are a plurality of reflective members.

17. An exposure control apparatus comprising:

a lens system for focusing image light representing an image;

a light source emitting a source light;

a spatial light modulator for receiving said image light and said source light, and having a plurality of controllable elements;

a photoelectric conversion device for converting said image light received via said spatial light modulator into an electrical signal; and control means for controlling, individually and simultaneously, said plurality of controllable elements of said spatial light modulator based on said electrical signal to switch states of said controllable elements from a first state, in which said source light is guided through said lens system, and a second state, in which said source light is not guided through said lens system.

18. The exposure control apparatus set forth in claim 17, wherein in said second state at least a portion of said received image light is guided to said photoelectric conversion device, and in said first state said image light is not guided to said photoelectric conversion device.

19. The exposure control apparatus set forth in claim 17, wherein said spatial light modulator guides said image light to said photoelectric conversion device by reflecting said image light.

20. The exposure control apparatus set forth in claim 17, wherein said plurality of controllable elements are a plurality of reflective members.

* * * * *